United States Patent
Abbas et al.

(10) Patent No.: US 12,126,809 B2
(45) Date of Patent: Oct. 22, 2024

(54) SYSTEMS AND METHODS FOR SPATIALLY SELECTIVE VIDEO CODING

(71) Applicant: GoPro, Inc., San Mateo, CA (US)

(72) Inventors: Adeel Abbas, Carlsbad, CA (US); Balineedu Chowdary Adsumilli, San Francisco, CA (US); Vadim Polonichko, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/144,574

(22) Filed: May 8, 2023

(65) Prior Publication Data

US 2023/0276054 A1  Aug. 31, 2023

Related U.S. Application Data

(63) Continuation of application No. 17/378,065, filed on Jul. 16, 2021, now Pat. No. 11,647,204, which is a (Continued)

(51) Int. Cl.
*H04N 19/597* (2014.01)
*H04N 13/00* (2018.01)
(Continued)

(52) U.S. Cl.
CPC .......... *H04N 19/137* (2014.11); *H04N 13/00* (2013.01); *H04N 19/107* (2014.11);
(Continued)

(58) Field of Classification Search
CPC .... H04N 19/137; H04N 13/00; H04N 19/107; H04N 19/167; H04N 19/597;
(Continued)

(56) References Cited

U.S. PATENT DOCUMENTS

| | | |
|---|---|---|
| 5,649,032 A | 7/1997 | Burt |
| 6,389,179 B1 | 5/2002 | Katayama |

(Continued)

OTHER PUBLICATIONS

Achanta R., et al., 'Slic Superpixeis Compared to State-of-the-Art Superpixei Methods,' IEEE Transactions on Pattern Analysis and Machine intelligence, 2012, vol. 34 (11), pp. 2274-2282.

(Continued)

*Primary Examiner* — Phuoc Tran
(74) *Attorney, Agent, or Firm* — Young Basile Hanlon & MacFarlane, P.C.

(57) ABSTRACT

Encoded content is accessed. The encoded content includes an encoded first centrally located tile corresponding to a first centrally located tile of a first image, an encoded first peripherally located tile of the first image, and an encoded second peripherally located tile of a second image. The encoded first peripherally located tile is decoded to obtain a decoded first peripherally located tile. The encoded second peripherally located tile is decoded to obtain a decoded second peripherally located tile. The decoded first peripherally located tile and the decoded second peripherally located tile are stitched to obtain a stitched image portion. The stitched image portion is encoded to obtain an encoded stitched image portion. An encoded stitched image of the first image and the second image is obtained by combining the encoded first centrally located tile, and the encoded stitched image portion.

20 Claims, 10 Drawing Sheets

Related U.S. Application Data continuation of application No. 16/666,094, filed on Oct. 28, 2019, now Pat. No. 11,122,271, which is a continuation of application No. 15/414,426, filed on Jan. 24, 2017, now Pat. No. 10,462,466.

(60) Provisional application No. 62/352,480, filed on Jun. 20, 2016.

(51) Int. Cl.
  *H04N 19/107*     (2014.01)
  *H04N 19/137*     (2014.01)
  *H04N 19/167*     (2014.01)
  *H04N 23/45*      (2023.01)
  *H04N 23/698*     (2023.01)

(52) U.S. Cl.
  CPC ......... *H04N 19/167* (2014.11); *H04N 19/597* (2014.11); *H04N 23/45* (2023.01); *H04N 23/698* (2023.01)

(58) Field of Classification Search
  CPC .... H04N 23/45; H04N 23/698; H04N 13/239; H04N 13/20; H04N 13/243; H04N 13/111; H04N 13/161
  See application file for complete search history.

(56) References Cited

U.S. PATENT DOCUMENTS

| | | | |
|---|---|---|---|
| 8,606,073 | B2 | 12/2013 | Woodman |
| 9,171,577 | B1 | 10/2015 | Newman |
| 9,277,122 | B1 | 3/2016 | Imura |
| 9,355,433 | B1 | 5/2016 | Adsumilli |
| 9,369,689 | B1 | 6/2016 | Tran |
| 9,575,803 | B2 | 2/2017 | Chauvet |
| 10,462,466 | B2 | 10/2019 | Abbas |
| 11,122,271 | B2 | 9/2021 | Abbas |
| 11,647,204 | B2 | 5/2023 | Abbas |
| 2003/0007567 | A1 | 1/2003 | Newman |
| 2003/0035047 | A1 | 2/2003 | Katayama |
| 2005/0226483 | A1 | 10/2005 | Geiger |
| 2006/0256397 | A1 | 11/2006 | Cui |
| 2006/0268131 | A1 | 11/2006 | Cutler |
| 2007/0064800 | A1 | 3/2007 | Ha |
| 2007/0237420 | A1 | 10/2007 | Steedly |
| 2012/0242788 | A1 | 9/2012 | Chuang |
| 2012/0307000 | A1 | 12/2012 | Doepke |
| 2014/0218354 | A1 | 8/2014 | Park |
| 2014/0307046 | A1 | 10/2014 | Accardo |
| 2015/0065803 | A1 | 3/2015 | Douglas |
| 2015/0109468 | A1 | 4/2015 | Laroia |
| 2015/0124877 | A1 | 5/2015 | Choi |
| 2015/0138311 | A1 | 5/2015 | Towndrow |
| 2015/0249813 | A1 | 9/2015 | Cole |
| 2015/0341552 | A1 | 11/2015 | Chen |
| 2015/0341557 | A1 | 11/2015 | Chapdelaine-Couture |
| 2015/0346832 | A1 | 12/2015 | Cole |
| 2016/0012855 | A1* | 1/2016 | Krishnan ......... H04N 21/21805 386/241 |
| 2016/0065947 | A1 | 3/2016 | Cole |
| 2016/0142697 | A1* | 5/2016 | Budagavi ............. H04N 13/106 348/43 |
| 2016/0241892 | A1 | 8/2016 | Cole |
| 2016/0253795 | A1 | 9/2016 | Cole |
| 2016/0274338 | A1 | 9/2016 | Davies |
| 2016/0295128 | A1 | 10/2016 | Schnittman |
| 2016/0353090 | A1 | 12/2016 | Esteban |
| 2017/0366812 | A1 | 12/2017 | Abbas |
| 2019/0037138 | A1 | 1/2019 | Choe |
| 2020/0059649 | A1 | 2/2020 | Abbas |
| 2021/0344927 | A1 | 11/2021 | Abbas |

OTHER PUBLICATIONS

Allene C, et al,, 'Seamless Image-based Texture Atlases Using Multi-band Blending,' Pattern Recognition, 2008. ICPR 2008. 19th International Conference on, 2008. 4 pages.

Badrinarayanan V., et al., 'Segnet: a Deep Convoiutional Encoder-Decoder Architecture for Image Segmentation,' arXiv preprint arXiv: 1511.00561, 2015. 14 pages.

Barghout L. and Sheynin J., 'Real-world scene perception and perceptual organization: Lessons from Computer Vision'. Journal of Vision, 2013, vol. 13 (9). (Abstract). 1 page.

Barghout L., 'Visual Taxometric approach Image Segmentation using Fuzzy-Spatial Taxon Cut Yields Contextually Relevant Regions,' Communications in Computer and Information Science (CCIS), Springer-Verlag, 2014, pp. 163-173.

Bay H., et al., 'Surf: Speeded up Robust Features,' European Conference on Computer Vision, Springer Berlin Heidelberg, 2006, pp. 404-417.

Beier et al., 'Feature-Based Image Metamorphosis,' in Computer Graphics Journal, Jul. 1992, vol. 28 (2), pp. 35-42.

Brainard R.C., et al., "Low-Resolution TV: Subjective Effects of Frame Repetition and Picture Replenishment," Bell Labs Technical Journal, Jan. 1967, vol. 46 (1), pp. 261-271.

Burt et al., 'A Multiresolution Spline with Application to Image Mosaics,' in ACM Transactions on Graphics (TOG), 1983, vol. 2, No. 4, pp. 217-236.

Chan et al., 'Active contours without edges'. IEEE Transactions on Image Processing, 2001, 10 (2), pp. 266-277 (hereinafter 'Chan').

Chang H., et al., 'Super-resolution Through Neighbor Embedding,' Computer Vision and Pattern Recognition, 2004. CVPR2004. Proceedings of the 2004 IEEE Computer Society Conference on, vol. 1, 2004. 8 pages.

Elen, 'Whatever happened to Ambisonics' AudioMedia Magazine, Nov. 1991. 18 pages.

Gracias, et al., 'Fast Image Blending Using Watersheds and Graph Cuts,' Image and Vision Computing, 2009, vol. 27 (5), pp. 597-607.

Grois, et al., 'Recent Advances in Region-of-Interest Video Coding' In: 'Recent Advances on Video Coding', Jul. 5, 2011 (Jul. 5, 2011), InTech, XP055257835, ISBN: 978-953-30-7181-7 DOI: 10.5772/17789, 29 pages.

Grois, et al., "Efficient Adaptive Bit-Rate Control for ROI Scalable Video Coding", Workshop on Picture Coding and Image Processing 2010; Jul. 12, 2010-Jul. 12, 2010; NAGOYA, Dec. 7, 2010 (Dec. 7, 2010), KP030082089, 2 pages.

H.264 (Oct. 2012) and/or ISO/IEC 14496-10:2012, Information technology—Coding of audio-visual objects—Part 10: Advanced Video Coding, 402 pages.

Herbst E., et al., 'Occlusion Reasoning for Temporal Interpolation Using Optical Flow,' Department of Computer Science and Engineering, University of Washington, Tech. Rep. UW-CSE-09-08-01, 2009. 41 pages.

High Efficiency Video Coding (HEVC), also known as H.265 (described in e.g., ITU-T Study Group 16—Video Coding Experts Group (VCEG)—ITU-T H.265, and/or ISO/IEC JTC 1/SC 29/WG 11 Motion Picture Experts Group (MPEG)—the HEVC standard ISO/IEC 23008-2:2015, 657 pages.

Ichimura D., et al., 'Slice Group Map for Mult. Interactive ROI Seal', 17. JVT Meeting; 74. MPEG Meeting; Oct. 14, 2005-Oct. 21, 2005; Nice, FR;(Joint Video Team of ISO/IEC JTC1/SC29/WG11 and ITU-T SG. 16), No. JVT-Q020r1, Oct. 14, 2005 (Oct. 14, 2005), XP030006183, ISSN: 0000-0413. 20 pages.

Jakubowski M., et aL, 'Block-based motion estimation algorithmsa survey,' Opto-Eiectronics Review 21, No. 1 (2013), pp. 88-102.

Kendall A., et al., 'Bayesian Segnet: Model Uncertainty in Deep Convolutional Encoder-Decoder Architectures for Scene Understanding,' arXiv: 1511.02680, 2015. (11 pages).

Lowe, David G. "Object recognition from local scale-invariant features." In Computer vision, 1999. The proceedings of the seventh IEEE international conference on, vol. 2, pp. 1150-1157. IEEE 1999. (Year: 1999).

Mitzel D., et al., 'Video Super Resolution Using Duality Based TV-l1 Optical Flow,' Joint Pattern Recognition Symposium, 2009, pp. 432-441.

(56) References Cited

OTHER PUBLICATIONS

Perez et al., 'Poisson Image Editing,' in ACM Transactions on Graphics (TOG), 2003, vol. 22, No. 3, pp. 313-318.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
Schwartz, E., et al., "Implementation of Compression with Reversible Embedded Wavelets," In Proc. SPIE, 1995, 12 pages.
Suzuki et al., 'Inter Frame Coding with Template Matching Averaging,' in IEEE international Conference on Image Processing Proceedings (2007), vol. (iII), pp. 409-412.
Szeliski R., "Computer Vision: Algorithms and Applications," Springer Science & Business Media, 2010, 979 pages.
Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.
Ugur et al., "MV-HEVC/SHVC HLS: On default Output Layer Sets", Jan. 2014. 4 pages.
Vass, J., et al., 'Efficient Three-Dimensional Wavelet Codecs for Networked Video Communication,' in Proceedings of IEEE International Conference on Image Processing, Kobe, Japan, Oct. 1999, pp. 565-569.
Won, et al., 'Size-Controllable Region-of-Interest in Scalable Image Representation', IEEE Transactions on Image Processing, IEEE Service Center, Piscataway, NJ, US, vol. 20, No. 5, May 1, 2011 (May 1, 2011), pp. 1273-1280, XPO 11411787, ISSN: 1057-7149, DOI: 10.1109/TIP.2010.2090534.
Xiao, et al., 'Multiple View Semantic Segmentation for Street View Images,' 2009 IEEE 12th International Conference on Computer Vision, 2009, pp. 686-693.
Xiong Y et al., 'Gradient Domain Image Blending and Implementation on Mobile Devices,' International Conference on Mobile Computing, Applications, and Services, Springer Berlin Heidelberg, 2009, pp. 293-306.
Zhai et al., "A Low Complexity Motion Compensated Frame Interpolation Method," in IEEE International Symposium on Circuits and Systems (2005), pp. 4927-4930.
Zhang., "A Flexible New Technique for Camera Calibration" IEEE Transactions, dated Nov. 2000, vol. 22, No. 11, pp. 1330-1334.

\* cited by examiner

SYSTEMS AND METHODS FOR SPATIALLY SELECTIVE VIDEO CODING

CROSS-REFERENCE TO RELATED APPLICATION(S)

This application is a continuation of U.S. patent application Ser. No. 17/378,065, filed on Jul. 16, 2021, which is a continuation of U.S. patent application Ser. No. 16/666,094, filed on Oct. 28, 2019, now U.S. Pat. No. 11,122,271, which is a continuation of U.S. patent application Ser. No. 15/414,426, filed on Jan. 24, 2017, now U.S. Pat. No. 10,462,466, which claims the benefit of priority to U.S. Provisional Patent Application Ser. No. 62/352,480, filed on Jun. 20, 2016, the contents of which being incorporated herein by reference in their entireties.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates generally to storing and/or presenting of image and/or video content and more particularly in one exemplary aspect to encoding, decoding, and/or transmission of panoramic and/or spherical video content.

BACKGROUND

Virtual reality (VR) content and/or panoramic content may include, for example, video content having a bitstream characterized by high data rates, e.g., in excess of 10 megabits per second (mbps). A user may wish to view high data rate content on a resource limited device (e.g., battery operated computing device (e.g., a tablet computer, a smartphone)) and/or other device that may be characterized by a given amount of available energy, data transmission bandwidth, and/or computational capacity. Resources available to such resource limited devices may prove inadequate for receiving and/or decoding full resolution and/or full frame high resolution image content.

Accordingly, what is needed are dynamic encoding devices and methods that are able to provide, for example, encoded VR video content and/or panoramic video content in accordance with these varying resource limited devices.

SUMMARY

The present disclosure satisfies the foregoing needs by providing, inter alia, methods and apparatus for provision of spatially selective encoding of, for example, VR or panoramic content.

In a first aspect, a system for providing video content is disclosed. In one embodiment, the system includes an electronic storage configured to store video content, the video content comprising a predesignated bitrate image; a communications interface configured to communicate a bit stream to a client device; and one or more processors configured to execute a plurality of computer readable instructions, the plurality of computer readable instructions configured to, when executed: access an encoded image; decode the encoded image; obtain a stitched image from the decoded image; encode one or more individual image portions of the stitched image proximate to a boundary area; obtain an encoded stitched image through the combination of selectively encoded portions of the stitched image and encoded one or more individual image portions of the encoded image; access the predesignated bitrate image; partition the predesignated bitrate image into image portions based on a dimension of a viewport, the image portions including a first image portion and a second image portion; obtain quality distributions corresponding to the image portions, the quality distributions including a first quality distribution corresponding to the first image portion and a second quality distribution corresponding to the second image portion; encode the individual image portions using the corresponding quality distributions; receive a request for a viewport of the predesignated bitrate image; determine a viewport position of the viewport within the predesignated bitrate image; and provide a part of the encoded individual image portions having the corresponding quality distributions corresponding to the viewport position to the client device.

In one variant, the encoded one or more individual image portions further comprises a circular central portion.

In another variant, the encoded one or more individual image portions further comprise a polygon shaped central portion.

In yet another variant, the selectively encoded portions of the stitched image further comprise one or more peripheral portions that are polygon shaped.

In yet another variant, the polygon shaped central portion is a square and the one or more peripheral portions are rectangles.

In yet another variant, the encoded image is encoded using an HEVC standard encoder configured to partition the encoded image into multiple tiles; and an encoding of individual ones of the multiple tiles is configured in accordance with a motion constrained tile encoding profile.

In a second aspect, a method for providing video content is disclosed. In one embodiment, the method includes accessing a stitched panoramic image, the stitched panoramic image having been encoded using a first quality distribution; obtaining a position change of a viewport, the position change of the viewport corresponding to a portion of the stitched panoramic image; determining whether the position change of the viewport exceeds a threshold; responsive to a determination that the position change of the viewport exceeds the threshold, encoding at least a first portion of the stitched panoramic image using a second quality distribution and providing the first portion of the stitched panoramic image encoded using the second quality distribution; and responsive to a determination that the position change does not exceed the threshold, providing the stitched panoramic image having been encoded using the first quality distribution, the first quality distribution differing from the second quality distribution.

In one variant, the method further includes combining the first portion of the stitched panoramic image encoded using the second quality distribution with at least one other portion of the stitched panoramic image encoded using the first quality distribution; and providing the encoded first portion and the encoded at least one other portion to a display device.

In another variant, the method further includes determining a boundary area of the panoramic stitched image, the boundary area of the panoramic stitched image corresponding to a stitching line.

In yet another variant, the method further includes encoding portions within the boundary area of the panoramic stitched image using the second quality distribution.

In yet another variant, the method further includes encoding portions outside the boundary area of the panoramic stitched image using the first quality distribution.

In yet another variant, the method further includes combining the encoded portions within the boundary area with encoded portions outside the boundary area; and providing the combined encoded portions in a format suitable for display on a display device.

In a third aspect, a computer readable apparatus is disclosed. In one embodiment, the computer readable apparatus includes a storage medium having a plurality of computer executable instructions stored thereon, the computer executable instructions are configured to, when executed: access a stitched panoramic image having been encoded at a first quality distribution; determine individual portions of the stitched panoramic image; encode a first portion of the individual portions of the stitched panoramic image using a second quality distribution; combine the encoded first portion of the individual portions of the stitched panoramic image with other portions of the individual portions of the stitched panoramic image to produce a combined panoramic portion of the image; and store the combined panoramic portion of the image.

In one variant, the computer executable instructions are configured to, when executed: provide the stored combined panoramic portion of the image to a display device.

In another variant, the determination of the individual portions of the stitched panoramic image further comprises a determination of a partitioning configuration for the stitched panoramic image.

In yet another variant, the partitioning configuration comprises a circular center area portion and a surrounding area portion that is proximate the circular center area portion.

In yet another variant, the first portion of the individual portions of the stitched panoramic image consists of the surrounding area portion.

In a fourth aspect, an integrated circuit device is disclosed. In one embodiment, the integrated circuit device further includes logic configured to: access a stitched panoramic image having been encoded at a first quality distribution; determine individual portions of the stitched panoramic image; encode a first portion of the individual portions of the stitched panoramic image using a second quality distribution; combine the encoded first portion of the individual portions of the stitched panoramic image with other portions of the individual portions of the stitched panoramic image to produce a combined panoramic portion of the image; and store the combined panoramic portion of the image.

A fifth aspect is a method for encoding images. The method includes decoding a first encoded image to obtain a first decoded image, where the first decoded image includes a first decoded portion corresponding to a first encoded portion of the first encoded image and a second decoded portion corresponding to a second encoded portion of the first encoded image; decoding a second encoded image to obtain a second decoded image; combining the first decoded image and the second decoded image to obtain a single decoded image; and encoding the single decoded image to obtain a single encoded image that includes a third encoded portion and a fourth encoded portion. Encoding the single decoded image includes obtaining the third encoded portion of the single encoded image by copying the first encoded portion of the first encoded image; and obtaining the fourth encoded portion of the single encoded image by encoding the second decoded portion using an encoder.

A sixth aspect is a device for encoding images. The device includes a processor that is configured to decode a first encoded image to obtain a first decoded image; decode a second encoded image to obtain a second decoded image; stich the first decoded image and the second decoded image to obtain a stitched image; and obtain a stitched encoded image of the stitched image. To obtain the stitched encoded image includes to obtain a first portion of the stitched encoded image by duplicating values of a centrally located region of the first encoded image.

A seventh aspect is a non-transitory computer-readable storage medium that includes executable instructions that, when executed by a processor, facilitate performance of operations including operations to stitch a first decoded image of a first encoded image and a second decoded image of a second encoded image along a stitch boundary to obtain a stitched image; and encode the stitched image by operations to partition the stitched image into portions, the portions comprising a first portion and a second portion; copy bit values corresponding to the first portion from a corresponding portion of the first encoded image; and encode the second portion according to a coding standard.

An eighth aspect is a system that includes a processing apparatus. The processing apparatus includes a first processor configured to execute instructions to access encoded content. The encoded content includes an encoded first centrally located tile corresponding to a first centrally located tile of a first image, an encoded first peripherally located tile of the first image, and an encoded second peripherally located tile of a second image. The first processor is further configured to execute instructions to decode the encoded first peripherally located tile to obtain a decoded first peripherally located tile; decode the encoded second peripherally located tile to obtain a decoded second peripherally located tile; stitch the decoded first peripherally located tile and the decoded second peripherally located tile to obtain a stitched image portion; encode the stitched image portion to obtain an encoded stitched image portion; and obtain an encoded stitched image of the first image and the second image by combining the encoded first centrally located tile, and the encoded stitched image portion.

A ninth aspect is a method that includes partitioning images into one or more centrally located tiles and one or more peripherally located tiles. The images are partitioned such that the peripherally located tiles contain a stitching boundary and the centrally located tiles do not contain any stitching boundaries. The method also includes encoding the images to obtain encoded images such that the centrally located tiles are encoded without reference to the peripherally located tiles, and wherein the encoded images include respective encoded centrally located tiles and respective encoded peripherally located tiles.

A tenth aspect is a non-transitory computer-readable storage medium that includes executable instructions that, when executed by a processor, facilitate performance of operations to receive encoded content that includes an encoded centrally located tile corresponding to a centrally located tile of a first image, encoded first peripherally located tiles of the first image, and encoded second peripherally located tiles of a second image; decode the encoded first peripherally located tiles and the encoded second peripherally located tiles, and omit decoding the encoded centrally located tile; stitch at least one of the decoded first peripherally located tile and at least one of the decoded second peripherally located tile to obtain a stitched image portion; encode the stitched image portion to obtain an encoded stitched image portion; and obtain an encoded stitched image of the first image and the second image by combining the encoded centrally located tile and the encoded stitched image portion.

Other features and advantages of the present disclosure will immediately be recognized by persons of ordinary skill in the art with reference to the attached drawings and detailed description of exemplary embodiments as given below.

All Figures disclosed herein are © Copyright 2019 GoPro Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations are possible by way of interchange of or combination with some or all of the described or illustrated elements. Wherever convenient, the same reference numbers will be used throughout the drawings to refer to same or like parts.

Systems and methods for providing video content using a spatially selective coding quality are provided. Panoramic content (e.g., content captured using a 180° field of view (FOV), a 360° FOV and/or other fields of view) and/or virtual reality (VR) content, may be characterized by high image resolution (e.g., 1100 pixels by 3000 pixels (BK)) and/or high bit rates (e.g., in excess of 100 megabits per second (mbps)). Presently available standard video compression codecs, e.g., H.264 (described in ITU-T H.264 (01/2012) and/or ISO/IEC 14496-10:2012, Information technology—Coding of audio-visual objects—Part 10: Advanced Video Coding, each of the foregoing incorporated herein by reference in its entirety), High Efficiency Video Coding (HEVC), also known as H.265 (described in e.g., ITU-T Study Group 16—Video Coding Experts Group (VCEG)-ITU-T H.265, and/or ISO/IEC JTC 1/SC 29/WG 11Motion Picture Experts Group (MPEG)-the HEVC standard ISO/IEC 23008-2:2015, each of the foregoing incorporated herein by reference in its entirety), and/or VP9 video codec (described at e.g., http://www.webmpro ject.org/vp9, the foregoing incorporated herein by reference in its entirety), may prove non-optimal for providing a viewport portion of the panoramic and/or VR content to resource limited devices.

When obtaining panoramic (e.g., 360°) content two or more images may be combined. In some implementations, six or more source images may be combined (stitched together along a boundary between the images) to obtain an image with a 360° FOV. In some implementations the source images may be obtained using a multi-lens and/or multi-camera system, such as the capture apparatus 110 shown and described with respect to FIG. 1A. In some implementations, two source images (e.g., 180° or greater FOV) may be stitched along a boundary between the images to obtain an image with a 360° FOV. This stitched image may be rendered in an equirectangular projection (ERP), a cubic projection and/or another projection. The source images may be obtained using a dual-lens camera system, such as the system 200 shown and described with respect to FIG. 2A.

Figure 1A:
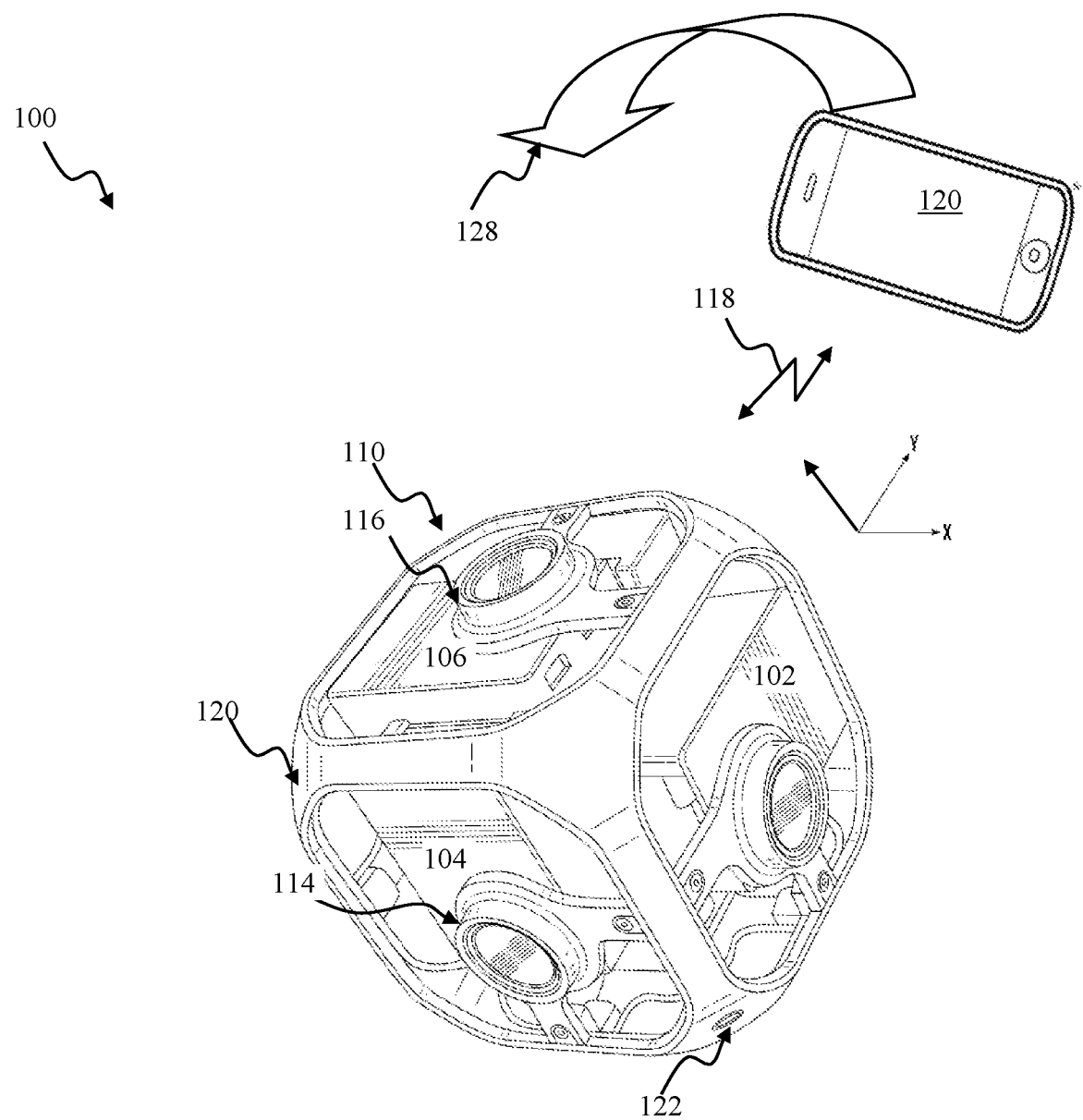
FIG. 1A illustrates a system for content capture and viewing.

FIG. 1A illustrates an exemplary capture system configured for acquiring panoramic content, in accordance with one implementation. The system 100 of FIG. 1A may include capture apparatus 110, e.g., such as GoPro activity camera, e.g., HERO4 Silver, and/or other image capture devices.

The capture apparatus 110 may include 6-cameras (e.g., 104, 106, 102) disposed in a cube-shaped cage 120. The cage 120 dimensions may be selected between 25 mm and 150 mm, preferably 105 mm in some implementations. The cage 120 may be outfitted with a mounting port 122 configured to enable attachment of the camera to a supporting structure (e.g., a tripod, a photo stick). The cage 120 may provide a rigid support structure. Use of a rigid structure may ensure that orientation of individual cameras with respect to one another may remain at a given configuration during operation of the apparatus 110.

Individual capture devices (e.g., 102) may comprise a video camera device, such as those described in, e.g., U.S. patent application Ser. No. 14/920,427 entitled "APPARATUS AND METHODS FOR EMBEDDING METADATA INTO VIDEO STREAM" filed on Oct. 22, 2015, the foregoing being incorporated herein by reference in its entirety.

In some implementations, the capture device may include two camera components (including a lens and imaging sensors) that are disposed in a Janus configuration, e.g., back to back such as those described in U.S. patent application Ser. No. 29/548,661, entitled "MULTI-LENS CAMERA" filed on 15 Dec. 2015, the foregoing being incorporated herein by reference in its entirety.

The capture apparatus 110 may be configured to obtain imaging content (e.g., images and/or video) with, e.g., a 360° FOV, also referred to as panoramic or spherical content, e.g., such as shown and described in U.S. patent application Ser. No. 14/949,786, entitled "APPARATUS AND METHODS FOR IMAGE ALIGNMENT" filed on Nov. 23, 2015, and/or U.S. patent application Ser. No. 14/927,343, entitled "APPARATUS AND METHODS FOR ROLLING SHUTTER COMPENSATION FOR MULTI-CAMERA SYSTEMS", filed 29 Oct. 2015, each of the foregoing being incorporated herein by reference in its entirety.

Individual cameras (e.g., 102, 104, 106) may be characterized by a 120° FOV in the longitudinal dimension and a 90° FOV in the latitudinal dimension. In order to provide for an increased overlap between images obtained with adjacent cameras, image sensors of any two adjacent cameras may be configured at 90° with respect to one another. By way of non-limiting illustration, longitudinal dimension of camera 102 sensor may be oriented at 90° with respect to longitudinal dimension of the camera 104 sensor; longitudinal dimension of camera 106 sensor may be oriented at 90° with respect to longitudinal dimension 116 of the camera 104 sensor. The camera sensor configuration illustrated in FIG. 1A, may provide for 420° angular coverage in vertical and/or horizontal planes. Overlap between the FOVs of adjacent cameras may provide for an improved alignment and/or stitching of multiple source images to produce, e.g., a panoramic image, particularly when source images may be obtained with a moving capture device (e.g., a rotating camera).

Individual cameras of the apparatus 110 may comprise a lens e.g., lens 114 of the camera 104, lens 116 of the camera 106. In some implementations, the individual lens may be characterized by what is referred to as fisheye pattern and produce images characterized by fish eye (or near-fish eye) FOV. Images captured by two or more individual cameras of the apparatus 110 may be combined using a stitching of fisheye projections of captured images to produce an equirectangular planar image, in some implementations, e.g., such as that shown in U.S. patent application Ser. No. 14/622,427 entitled "APPARATUS AND METHODS FOR EMBEDDING METADATA INTO VIDEO STREAM" filed on 22 Oct. 2015, incorporated herein by reference in its entirety. In some implementations, images captured by apparatus 110 may also be combined to produce a cubic projection without first converting captured images to equirectangular and/or other projection(s).

The capture apparatus 110 may house one or more internal metadata sources, e.g., video, inertial measurement unit, global positioning system (GPS) receiver component and/or other metadata source. In some implementations, the capture apparatus 110 may comprise a device such as that described in U.S. patent application Ser. No. 14/622,427, entitled "APPARATUS AND METHODS FOR EMBEDDING METADATA INTO VIDEO STREAM" filed on 22 Oct. 2015, incorporated supra. The capture apparatus 110 may comprise one or optical elements 102. Individual optical elements 116 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical elements/lenses.

The capture apparatus 110 may include one or more image sensors including, by way of non-limiting example, one or more of charge-coupled device (CCD) sensor, active pixel sensor (APS), complementary metal-oxide semiconductor (CMOS) sensor, N-type metal-oxide-semiconductor (NMOS) sensor, and/or other image sensors. The capture apparatus 110 may include one or more microphones configured to provide audio information that may be associated with images being acquired by the image sensor.

The capture apparatus 110 may be interfaced to an external metadata source (e.g., GPS receiver, cycling computer, metadata puck, and/or other device configured to provide information related to system 100 and/or its environment) via a remote link. The capture apparatus 110 may interface to an external user interface device 120 via the link 118. In some implementations, the device 120 may correspond to a smartphone, a tablet computer, a phablet, a smart watch, a portable computer, and/or other device configured to receive user input and communicate information with the camera capture device 110. In some implementations, the capture apparatus 110 may be configured to provide panoramic content (or portion(s) thereof) to the device 120 for viewing.

In one or more implementations, the link 118 may be configured to utilize any practical wireless interface configuration, e.g., WiFi, Bluetooth (BT), cellular data link, ZigBee, near field communications (NFC) link, e.g., using ISO/IEC 14443 protocol, ANT+link, and/or other wireless communications links. In some implementations, the link 118 functionality may be effectuated using a wired interface, e.g., HDMI, USB, digital video interface, display port interface (e.g., digital display interface developed by the Video Electronics Standards Association (VESA), Ethernet, Thunderbolt), and/or other interfaces.

In some implementations (not shown) one or more external metadata devices may interface to the apparatus 110 via a wired link, e.g., HDMI, USB, coaxial audio, and/or other wired interfaces. In one or more implementations, the capture apparatus 110 may house one or more sensors (e.g., GPS, pressure, temperature, heart rate, and/or other sensors). The metadata obtained by the capture apparatus 110 may be incorporated into the combined multimedia stream using any applicable methodologies including those described in U.S. patent application Ser. No. 14/622,427 entitled "APPARATUS AND METHODS FOR EMBEDDING METADATA INTO VIDEO STREAM" filed on Oct. 22, 2015, incorporated supra.

The user interface device 120 may operate a software application (e.g., GoPro Studio, GoPro App, and/or other application) configured to perform a variety of operations related to camera configuration, control of video acquisition, and/or display of video captured by, e.g., the camera apparatus 110. An application (e.g., GoPro App) may enable a user to create short video clips and share clips to, e.g., a cloud service (e.g., Instagram, Facebook, YouTube, Dropbox); perform full remote control of camera 110 functions, live preview video being captured for shot framing, mark key moments while recording with HiLight Tag, View HiLight Tags in Go Pro Camera Roll for location and/or playback of video highlights, wirelessly control camera software, and/or perform other functions. Various methodologies may be utilized for configuring the camera apparatus 110 and/or displaying the captured information, including those described in U.S. Pat. No. 8,606,073, entitled "BROADCAST MANAGEMENT SYSTEM", issued Dec. 10, 2013, the foregoing being incorporated herein by reference in its entirety.

By way of an illustration, the device 120 may receive user setting characterizing image resolution (e.g., 3840 pixels by 2160 pixels), frame rate (e.g., 60 frames per second (fps)), and/or other settings (e.g., location) related to the activity (e.g., mountain biking) being captured. The user interface device 120 may communicate the settings to the camera apparatus 110.

A user may utilize the device 120 to view content acquired by the capture apparatus 110. Display of the device 120 may act as a viewport into 3D space of the panoramic content. In some implementation, the user interface device 120 may communicate additional information (e.g., metadata) to the camera apparatus 110. By way of an illustration, the device 120 may provide orientation of the device 120 with respect to a given coordinate system, to the apparatus 110 so as to enable determination of a viewport location and/or dimensions for viewing of a portion of the panoramic content. By way of an illustration, a user may rotate (e.g., sweep) the device 120 through an arc in space (as illustrated by arrow 128 in FIG. 1A). The device 120 may communicate display orientation information to the capture apparatus 110. The capture apparatus 110 may provide an encoded bitstream configured to enable viewing of a portion of the panoramic content corresponding to a portion of the environment of the display location as it traverses the path 128.

The capture apparatus 110 may include a display configured to provide information related to camera operation mode (e.g., image resolution, frame rate, capture mode (sensor, video, photo)), connection status (connected, wireless, wired connection), power mode (e.g., standby, sensor mode, video mode), information related to metadata sources (e.g., heart rate, GPS), and/or other information. The capture apparatus 110 may include a user interface component (e.g., one or more buttons) configured to enable a user to start, stop, pause, resume sensor and/or content capture. User commands may be encoded using a variety of approaches including but not limited to duration of button press (pulse width modulation), number of button presses (pulse code modulation) and/or a combination thereof. By way of an illustration, two short button presses may initiate a sensor acquisition mode; single short button press may be used to (i) communicate initiation of video and/or photo capture and cessation of video and/or photo capture (toggle mode); or (ii) video and/or photo capture for a given time duration or number of frames (burst capture). It will be recognized by those skilled in the arts that various user command communication implementations may be realized, e.g., short/long button presses.

Figure 1B:
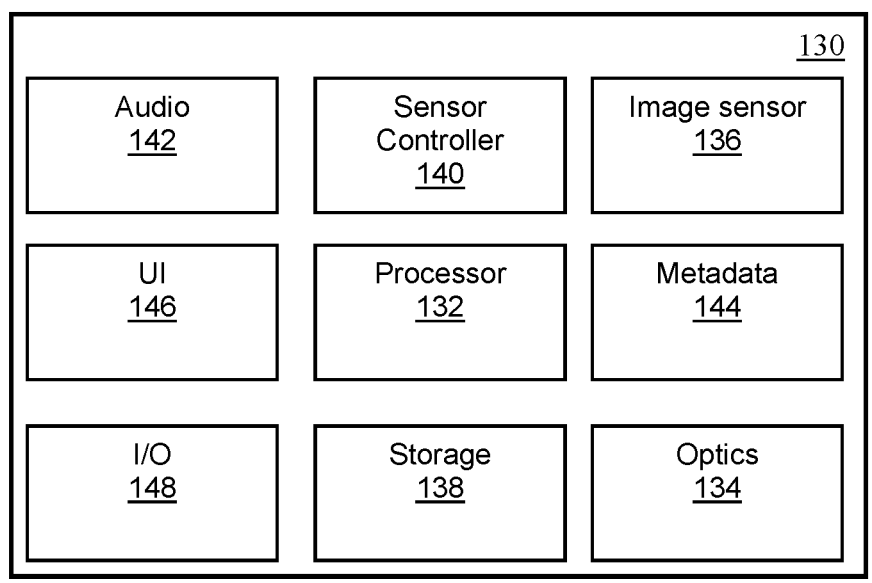
FIG. 1B is a functional block diagram illustrating a capture device for use with, e.g., system of FIG. 1A.

FIG. 1B illustrates one implementation of a camera apparatus for collecting metadata and content. The apparatus of FIG. 1B may comprise a capture device 130 that may include one or more processors 132 (such as system on a chip (SOC), microcontroller, microprocessor, CPU, DSP, ASIC, GPU, and/or other processors) that control the operation and functionality of the capture device 130. In some implementations, the capture device 130 in FIG. 1B may correspond to an action camera configured to capture photo, video and/or audio content.

The capture device 130 may include an optics module 134. In one or more implementations, the optics module 134 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component(s). In some implementations the optics module 134 may implement focus controller functionality configured to control the operation and configuration of the camera lens. The optics module 134 may receive light from an object and couple received light to an image sensor 136. The image sensor 136 may include, by way of non-limiting example, one or more of charge-coupled device sensor, active pixel sensor, complementary metal-oxide semiconductor sensor, N-type metal-oxide-semiconductor sensor, and/or other image sensor. The image sensor 136 may be configured to capture light waves gathered by the optics module 134 and to produce image(s) data based on control signals from the sensor controller module 140. Optics module 134 may include a focus controller configured to control the operation and configuration of the lens. The image sensor may be configured to generate a first output signal conveying first visual information regarding the object. The visual information may include, by way of non-limiting example, one or more of an image, a video, and/or other visual information. The optical element, and the first image sensor may be embodied in a housing.

In some implementations, the image sensor module 136 may include, without limitation, video sensors, audio sensors, capacitive sensors, radio sensors, vibrational sensors, ultrasonic sensors, infrared sensors, radar, LIDAR and/or sonars, and/or other sensory devices.

The apparatus 130 may include one or more audio components (e.g., microphone(s) embodied within the camera (e.g., audio module 142). Microphones may provide audio content information.

The apparatus 130 may include a sensor controller module 140. The sensor controller module 140 may be used to operate the image sensor 136. The sensor controller module 140 may receive image or video input from the image sensor 136; audio information from one or more microphones, such as from audio module 142. In some implementations, audio information may be encoded using audio coding format, e.g., AAC, AC 3, MP3, linear PCM, MPEG-H and or other audio coding format (audio codec). In one or more implementations of spherical video and/or audio, the audio codec may comprise a 3-dimensional audio codec, e.g., Ambisonics such as described at http://www.ambisonic.net/and/or http://www.digitalbrainstorming.th/db_data/eve/ambisonics/text01.pdf, the foregoing being incorporated herein by reference in its entirety.

The apparatus 130 may include one or more metadata modules 144 embodied within the camera housing and/or disposed externally to the camera. The processor 132 may interface to the sensor controller and/or one or more metadata modules 144. Metadata module 144 may include sensors such as an inertial measurement unit (IMU) including one or more accelerometers and/or gyroscopes, a magnetometer, a compass, a global positioning system (GPS) sensor, an altimeter, ambient light sensor, temperature sensor, and/or other sensors. The capture device 130 may contain one or more other metadata/telemetry sources, e.g., image sensor parameters, battery monitor, storage parameters, and/or other information related to camera operation and/or capture of content. Metadata module 144 may obtain information related to environment of the capture device and aspect in which the content is captured. By way of a non-limiting example, an accelerometer may provide device motion information, comprising velocity and/or acceleration vectors representative of motion of the capture device 130; the gyroscope may provide orientation information describing the orientation of the device 130, the GPS sensor may provide GPS coordinates, time, identifying the location of the device 130; and the altimeter may obtain the altitude of the camera 130. In some implementations, internal metadata module 144 may be rigidly coupled to the capture device 130 housing such that any motion, orientation or change in location experienced by the device 130 is also experienced by the metadata sensors 144. The sensor controller module 140 and/or processor 132 may be operable to synchronize various types of information received from the metadata sources. For example, timing information may be associated with the sensor data. Using the timing information metadata information may be related to content (photo/video) captured by the image sensor 136. In some implementations, the metadata capture may be decoupled from video/image capture. That is, metadata may be stored before, after, and in-between one or more video clips and/or images. In one or more implementations, the sensor controller module 140 and/or the processor 132 may perform operations on the received metadata to generate additional metadata information. For example, the microcontroller may integrate the received acceleration information to determine the velocity profile of the capture device 130 during the recording of a video. In some implementations, video information may consist of multiple frames of pixels using any applicable encoding method (e.g., H.262, H.264, Cineform and/or other standard).

The apparatus 130 may include electronic storage 138. The electronic storage 138 may comprise a system memory module is configured to store executable computer instructions that, when executed by the processor 132, perform various camera functionalities including those described herein. The electronic storage 138 may comprise storage memory configured to store content (e.g., metadata, images, audio) captured by the apparatus.

The electronic storage 138 may include non-transitory memory configured to store configuration information and/or processing code configured to enable, e.g., video information, metadata capture and/or to produce a multimedia stream comprised of, e.g., a video track and metadata in accordance with the methodology of the present disclosure. In one or more implementations, the processing configuration may comprise capture type (video, still images), image resolution, frame rate, burst setting, white balance, recording configuration (e.g., loop mode), audio track configuration, and/or other parameters that may be associated with audio, video and/or metadata capture. Additional memory may be available for other hardware/firmware/software needs of the apparatus 130. The processor 132 may interface to the sensor controller module 140 in order to obtain and process sensory information for, e.g., object detection, face tracking, stereo vision, and/or other tasks.

The processor 132 may interface with the mechanical, electrical sensory, power, and user interface 146 modules via driver interfaces and/or software abstraction layers. Additional processing and memory capacity may be used to support these processes. It will be appreciated that these components may be fully controlled by the processor 132. In some implementation, one or more components may be operable by one or more other control processes (e.g., a GPS receiver may comprise a processing apparatus configured to provide position and/or motion information to the processor 132 in accordance with a given schedule (e.g., values of latitude, longitude, and elevation at 10 Hz)).

The memory and processing capacity may aid in management of processing configuration (e.g., loading, replacement), operations during a startup, and/or other operations. Consistent with the present disclosure, the various components of the system may be remotely disposed from one another, and/or aggregated. For example, one or more sensor components may be disposed distal from the capture device, e.g., such as shown and describe with respect to FIG. 1A. Multiple mechanical, sensory, or electrical units may be controlled by a learning apparatus via network/radio connectivity.

The apparatus 130 may include user interface (UI) module 146. The UI module 146 may comprise any type of device capable of registering inputs from and/or communicating outputs to a user. These may include, without limitation, display, touch, proximity sensitive interface, light, sound receiving/emitting devices, wired/wireless input devices and/or other devices. The UI module 146 may include a display, one or more tactile elements (e.g., buttons and/or virtual touch screen buttons), lights (e.g., LEDs), speaker, and/or other UI elements. The UI module 146 may be operable to receive user input and/or provide information to a user related to operation of the camera apparatus 130.

The apparatus 130 may include an input/output (I/O) interface module 148. The I/O interface module 148 may be configured to synchronize the capture device 130 with other cameras and/or with other external devices, such as a remote control, a second capture device 130, a smartphone, a client device 120 of FIG. 1A and/or a video server. The I/O interface module 148 may be configured to communicate information to/from various I/O components. In some implementations the I/O interface module 148 may comprise a wired and/or wireless communications interface (e.g. WiFi, Bluetooth, USB, HDMI, Wireless USB, Near Field Communication (NFC), Ethernet, a radio frequency transceiver, and/or other interfaces) configured to communicate to one or more external devices (e.g., device 120 in FIG. 1A and/or a metadata source). In some implementations, the I/O interface module 148 may interface with LED lights, a display, a button, a microphone, speakers, and/or other I/O components. In one or more implementations, the I/O interface module 148 may interface to an energy source, e.g., battery and/or DC electrical source. The communications interface of the apparatus 130 may include one or more connections to external computerized devices to allow for, inter alia, configuration and/or management of remote devices e.g., as described above with respect to FIG. 1A and/or with respect to FIGS. 2A-2B. The connections may include any of the wireless or wireline interfaces discussed above, and further may include customized or proprietary connections for specific applications. In some implementations, the communications interface may comprise a component (e.g., a dongle), comprising an infrared sensor, a radio frequency antenna, ultrasonic transducer, and/or other communications interfaces. In one or more implementations, the communications interface may comprise a local (e.g., Bluetooth, Wi-Fi) and/or broad range (e.g., cellular LTE) communications interface configured to enable communications between the capture device (e.g., 110 in FIG. 1A) and a remote device (e.g., 120 in FIG. 1A).

The apparatus 130 may include a power system that may be tailored to the needs of the application of the device. For example, for a small-sized lower power action camera, a wireless power solution (e.g. battery, solar cell, inductive (contactless) power source, rectification, and/or other) may be used.

Figure 2A:
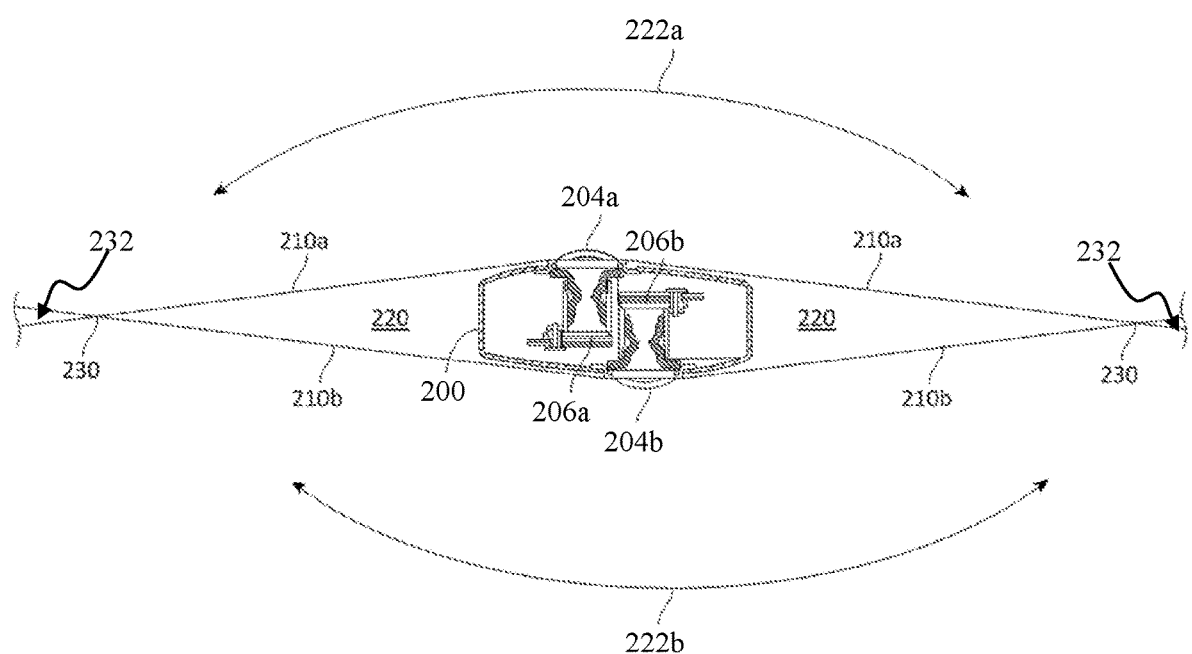
FIG. 2A is a graphical illustration depicting a field of view of a dual lens camera system configured for capturing spherical content in accordance with one implementation.

FIG. 2A illustrates a spherical image capture system 200 according to one implementation. A lens 204a of the spherical capture system 200 may be characterized by field of view 222a, boundaries of which are denoted by lines 210a. An image sensor 206a may be configured to obtain a first hyper-hemispherical image by capturing light entering the lens 204a. A lens 204b of the spherical capture system 200 may be characterized by FOV 222b boundaries of which are denoted by lines 210b. An image sensor 206b may be configured to obtain a first hyper-hemispherical image by capturing light entering the lens 204b. Field of view 222a of the lens 204a may overlap with FOV 222b of the lens 204b. Intersection locations between FOV 222a, 222b are denoted by lines 230 in FIG. 2A. Intersection region may be referred to as the stitch line and/or stitch area.

Regions 232 outside of overlap or stitch points 230 may be referred to as the overlap regions. Content within the overlap regions 232 may be captured by the lens 204a and the lens 204b. A portion of an image obtained by the sensor 206a and corresponding to overlap regions 232 may be correlated and/or aligned with the image portion obtained by the sensor 206b in order to align the captured fields of view 222a, 222b and/or improve stitch quality when obtaining a spherical combined image.

As may be understood from FIG. 2A, a change in alignment (e.g., position, tilt, etc.) between the lenses 204a, 204b or their respective image sensors 206a, 206b may cause changes the relative positions of their respective fields of view 222a, 222b and/or the locations of stitch points 230. Stitch location may be obtained or a given pair of images during obtaining of spherical imaging content.

In some implementations, the spherical capture system 202 may be configured to maintain the location and orientation of the lenses 204a, 204b and their respective image sensors 206a, 206b within a given tolerance (e.g., less than 1 degree) to ensure that the desired fields of view 222a, 222b are captured and that the stitching algorithm may accurately and efficiently stitch the images together. For example, in one implementation, optical axes through the lenses 204a, 204b may be configured along parallel lines (e.g., within a predefined tolerance such as 1%, 3%, 5%, 10%, etc.), and the image sensors 206a, 206b are maintained substantially perpendicular (e.g., within a predefined tolerance such as 1%, 3%, 5%, 10%, etc.) to the optical axes through their respective lenses 204a, 204b.

As shown in FIG. 2A, in one implementation, the lenses 204a, 204b are positioned laterally offset from each other and off-center from a central axis of the spherical capture system 200. As compared to a camera with back-to-back lenses (e.g., lenses aligned along the same axis), the laterally offset lenses 204a, 204b enable the spherical capture system 200 to be built with substantially reduced thickness while still accommodating the lengths of the lens barrels securing the lenses 204a, 204b. For example, in one implementation, the overall thickness of the spherical capture system 200 may be close to the length of a single lens barrel as opposed to twice the length of a single lens barrel as would be needed in a back-to-back configuration. Furthermore, in one implementation, to achieve best overlap in the fields of view 222a, 222b of the lenses 204a, 204b, the lenses 204a, 204b are positioned as close together laterally as allowable by the lens structure.

In some implementations, images or frames captured by an image capture device, such as the capture apparatus 110 shown in FIG. 1A/1B and the spherical capture system 200 shown in FIG. 2A, may be stitched together to produce a combined image, such as a spherical or panoramic image, which may be an equirectangular planar image. In some implementations, generating a combined image may include three-dimensional, or spatio-temporal, noise reduction (3DNR). In some implementations, pixels along the stitch boundary may be matched to reduce and/or altogether eliminate boundary discontinuities.

Figure 2B:
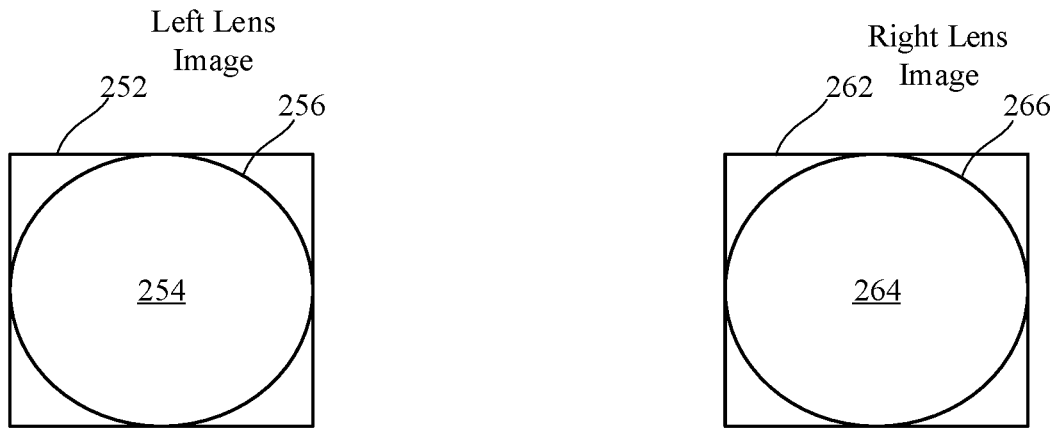
FIG. 2B is a graphical illustration depicting capture of spherical images using a camera system of e.g., FIG. 2A in accordance with one implementation.
Figure 2B:
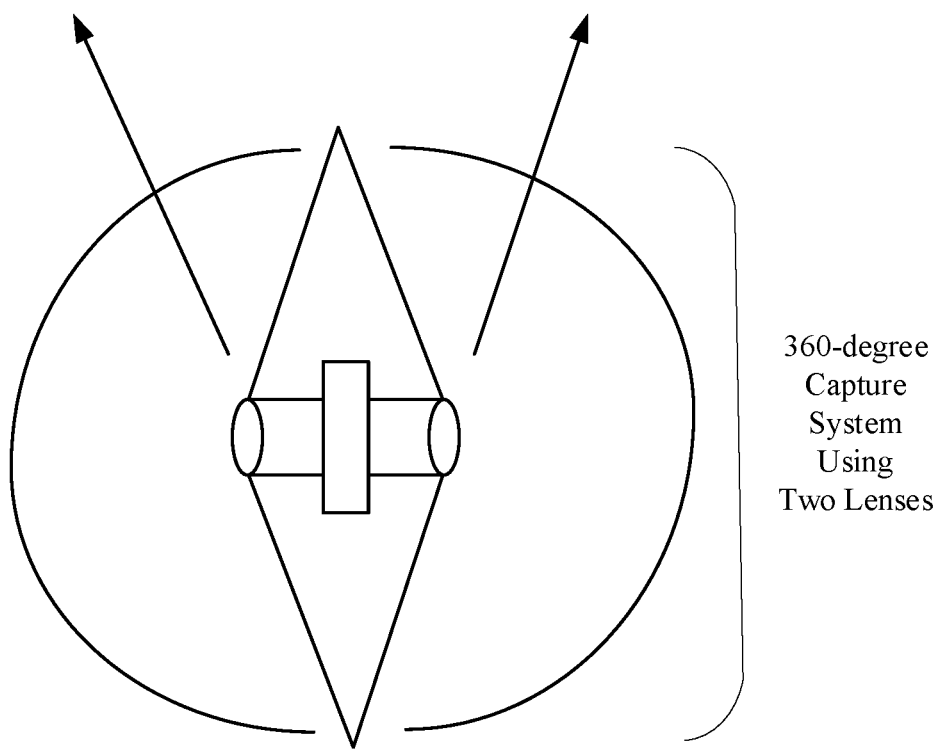

FIG. 2B illustrates capture of spherical images using a camera system of e.g., FIG. 2A in accordance with one implementation. Individual sensors of the capture device 200 may produce image frames 252, 262. Captured frames may include hemispherical images 254, 264 associated with fields of view 222a, 222b of FIG. 2A. Image FOV may be configured in excess of 180 degrees. Curves 256, 266 denote FOV boundaries of image frames 252, 262, respectively. Image boundaries 256, 266 in FIG. 2B may correspond to locations 230 in FIG. 2A.

Individual image frames 252, 262, representing two hemispheres, may be encoded using any applicable image and/or video codec, e.g., H.264, HEVC, and/or other codec. It will be recognized by those skilled in the arts that although methodology of the disclosure is illustrated herein using a dual-lens capture device, various other multi-camera capture configurations (e.g. 6-lens apparatus 110 of FIG. 1A, OMNI rig) and/or other configurations may be employed for obtaining panoramic content using methodology described herein.

Figure 3A:
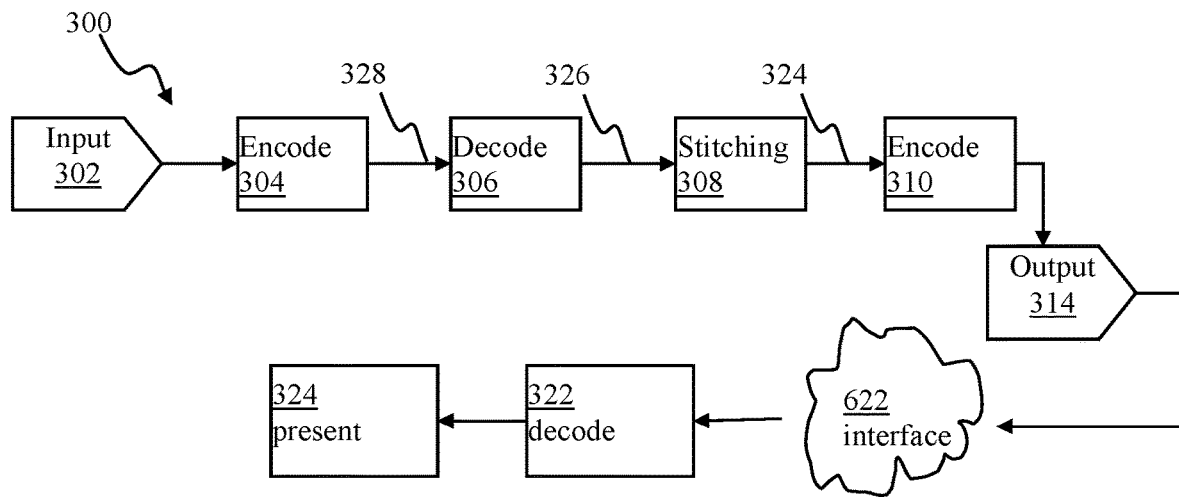
FIGS. 3A-3B are functional block diagrams depicting systems for providing panoramic imaging content in accordance with some implementations.
Figure 3B:
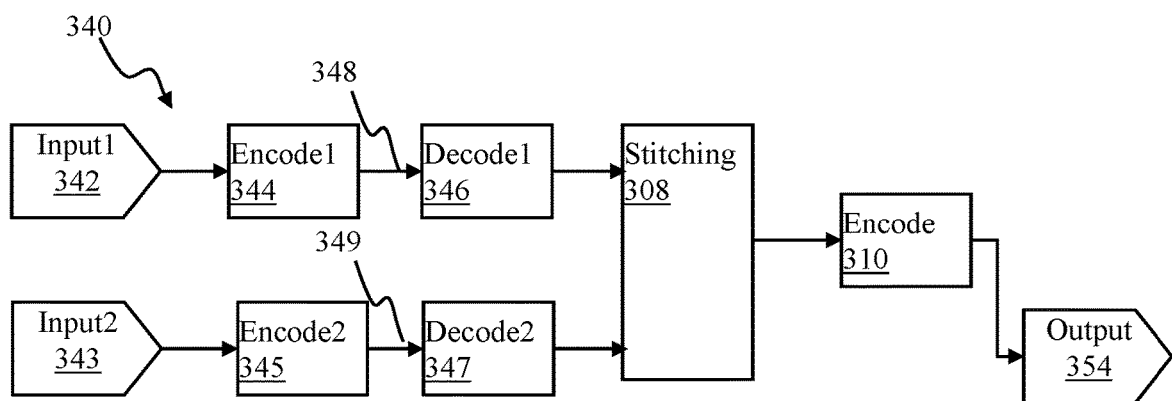

FIGS. 3A-3B are functional block diagrams illustrating systems for providing panoramic imaging content in accordance with some implementations.

The system 300 of FIG. 3A and/or system 340 of FIG. 3B may include spatially selectable encoder and/or configured to transform image input. In some implementations, the input 302 of FIG. 3A may include one or more images obtained with a capture device (e.g., apparatus 110 of FIG. 1A and/or apparatus 200 of FIG. 2A). The input 302 may include a left and a right image 252, 262 shown in FIG. 2B, (obtained by the sensors 206a, 206b of apparatus 200), and/or six images obtained using the apparatus 110 of FIG. 1A). In some implementations, the input 302 may include frames of pixels represented by a YUV color model. Image encoder 304 may be configured to effectuate any applicable encoding process, e.g., H.264, HEVC, and/or other codec. In some implementations, the encoder 304 may be embodied within a capture device (e.g., 110 of FIG. 1A and/or 130 of FIG. 1B). Encoded output 328 may be stored by a storage component of a capture device (e.g., component 138 of the device 130 of FIG. 1B) such as an SD card. In one or more implementations, the encoded output 328 may be provided via an input/output interface (e.g., 148 of FIG. 1B) such as HDMI, USB, Thunderbolt™ and/or other interface. The encoded output 328 may also be streamed (in real time) to a target device.

Encoded output may be decoded by component 306. In some implementations, decoder 306 may be embodied within a computerized user interface device (e.g., a smartphone, a tablet computer, a smart TV, a laptop, a set top box) and/or other apparatus configured to decode encoded images and/or video. Decoder 306 may be configured to support codec utilized by the encoder 304, process. By way of an illustration, if the encoder 304 configured using HEVC codec, the decoder 306 may be configured in accordance with the HEVC decoding process. Output of the decoder 306 may include multiple decoded images composed of pixels represented using, e.g., YUV color model. In some implementations, decoder 306 may be configured to decode peripheral portions of the encoded image, e.g., decoding portions 422, 424, 426, 428 of image 420.

The decoded output 326 (e.g., images) may be combined (stitched) to produce a panoramic image using stitching module 308. In some implementations, output of the decoder 306 may include a pair of hemispherical images, e.g., 252, 262 shown in FIG. 2B. Images may be stitched along a boundary area (e.g. are around the image circumference denoted by curves 256, 266 in FIG. 2B). For a pair of source images (e.g., 252, 262) stitched output 324 may include an equirectangular image in YUV format or other format.

The stitched (combined) output 324 may be encoded. The encoder 310 may be configured to implement a codec process compatible with the codec process of the encoder 304. Image processing configuration shown in FIG. 3A may include two image encoding operations: 304, 310. Multiple encoding of complete images may result in high computational load, high energy use, and/or cause encoding artifacts. The encoder 310 may implement spatially selective encoding methodology shown and described with respect to FIG. 4. Encoding methodology implemented by the encoder 310 may effectuate spatially selective encoding configured to reduce computational load, reduce energy use and/or reduce encoding artifacts.

Figure 6:
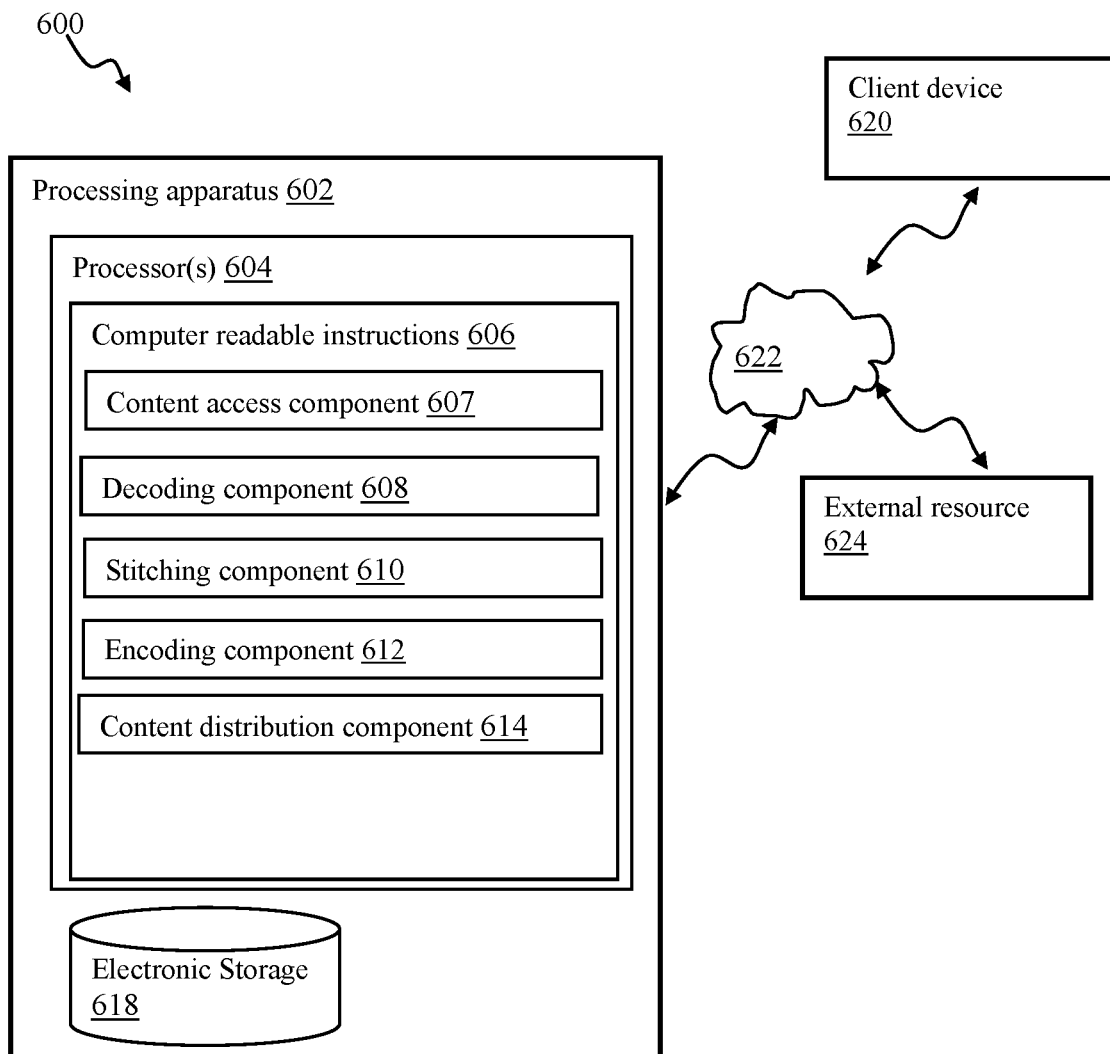
FIG. 6 is a functional block diagram illustrating a system for encoding/decoding imaging content using selective coding methodology of the disclosure.

Encoded output 324 may be distributed, using, e.g., a content distribution component 614 shown and described with respect to FIG. 6. The content distribution may include storing the content on the storage component (e.g., 618 in FIG. 6) for viewing; broadcasting content, and/or otherwise delivering content to one or more client devices (e.g., the remote device 620 (e.g., smartphone) and/or external resource(s) 624 (e.g., cloud storage)), and/or other operations. Content distribution may be effectuated via interface 622 described in detail with respect to FIG. 6. Components 306, 308, 310 may be embodied within a camera device, e.g., 130 of FIG. 1B, effectuated by a computer executable code executed by an integrated circuit (e.g., SOC, ASIC), and/or effectuated by a software application and/or software library executed by e.g., a desktop computer, a mobile device application (e.g., IOS and/or android App), a server, a smart TV, a set top box, and/or other computing device.

Encoded and distributed content may be decoded by a target device. In some implementations, the target device may correspond to a user interface device 120 of FIG. 1A and/or 620 of FIG. 6 and/or other computing and/or display devices. Decoding operations may be effectuated by a decoder 322 configured in accordance with encoding process of the encoder 310. By way of an illustration, the encoder 310 may be configured using HEVC codec operations, the decoder 322 may be configured in accordance with the HEVC decoding process. Decoded images and/or video may be presented (e.g., viewed) using a computer monitor, a mobile phone (e.g., using GoPro VR App or on http://vr.gopro.com), a TV, a VR headset, a digital projector, and/or other display device.

FIG. 3B illustrates a system including multiple encoder/decoder component and configured for providing panoramic imaging content in accordance with some implementations. The system 340 may include encoders 344, 345 configured to encode input 342, 343. In some implementations, the input 342, 343 of FIG. 3B may correspond to pairs of images obtained by a dual lens capture device (e.g., apparatus 200 of FIG. 2A). In some implementations, the input 342, 343 may include arrays of pixels represented YUV color model. Image encoders 342, 343 may be configured to operate in accordance with any applicable encoding process, e.g., H.264, HEVC, and/or other codec. In some implementations, the encoders 342, 343 may be embodied within a capture device (e.g., 110 of FIG. 1A and/or 200 of FIG. 2A).

Encoded output 348, 349 may be stored by a storage component of a capture device (e.g., component 138 of the device 130 of FIG. 1B) such as an SD card. In one or more implementations, the encoded output 348, 349 may be provided via an input/output interface (e.g., 148 of FIG. 1B) such as HDMI, USB, Thunderbolt™, and/or other interface. The encoded output 328 may also be streamed (in real time) to a target device.

Encoded output 348, 349 may be decoded by decoder components 346, 347, respectively. In some implementations, decoders 346, 347 may be embodied within a computerized user interface device (e.g., a smartphone, a tablet computer, a smart TV, a laptop, a set top box) and/or other apparatus configured to decode encoded images and/or video. Decoders 346, 347 may be configured to support codec utilized by the encoder 304, process. By way of an illustration, in an implementation wherein the encoders 344, 345 are configured using HEVC encoder process, the decoders 346, 347 may be configured in accordance with the HEVC decoding process. Output of decoders 346, 347 may include multiple decoded images composed of pixels represented using, e.g., the YUV color model. In some implementations, decoders 346, 347 may be configured to decode peripheral portions of the encoded image(s), e.g., decoding portions 422, 424, 4265, 428 of image 420.

Output of decoders 346, 347 (e.g., left/right hemispherical images) may be combined (stitched) to produce a panoramic image. In some implementations, output of the decoders 346, 347 may include a pair of hemispherical images, e.g., 252, 262 shown in FIG. 2B. Decoded images may be stitched along a boundary area (e.g. are around the image circumference denoted by curves 256, 266 in FIG. 2B. for a pair of source images (e.g., 252, 262) stitched output 324 may include an equirectangular image in YUV format or other format.

The stitched (combined) output may be encoded, using the selective encoding methodology described herein. Encoded output 354 may be provided to a target destination, e.g., a user interface device, a screen of a user interface device, electronic storage, and/or other devices.

Figure 4A:
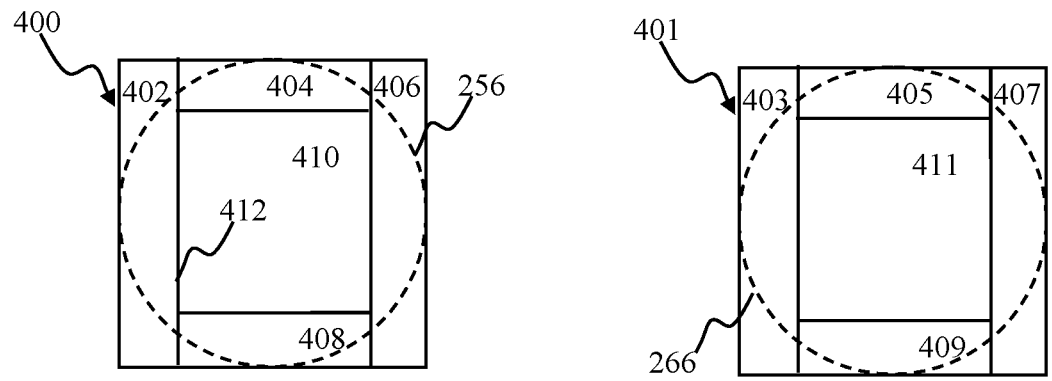
FIGS. 4A-4B illustrate exemplary image tiling configuration for use with the selective coding methodology of the disclosure.
Figure 4B:
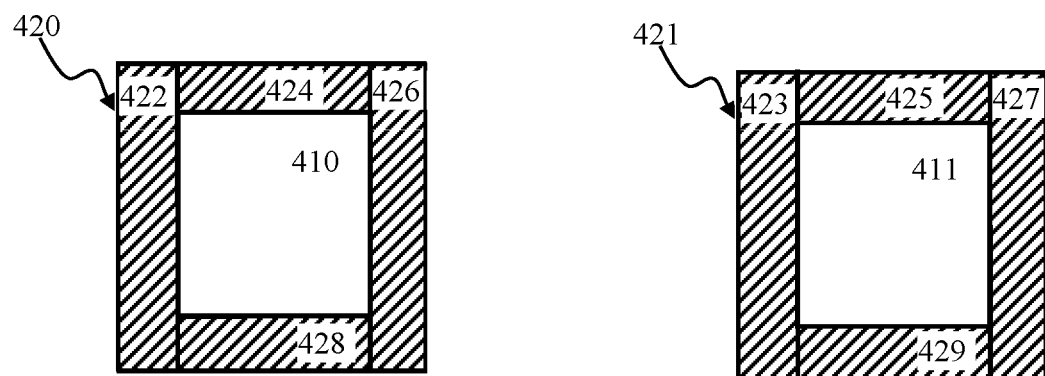

FIGS. 4A-4B illustrate exemplary tiling configurations for use with the spatially selective coding methodology of the disclosure. Images 400, 401 in FIG. 4A may correspond to encoded images 252, 262 shown in FIG. 2B and obtained by a capture device 200 of FIG. 2A. By way of an illustration, images 400, 401 may correspond to output 328 produced by encoder 304. Encoder 308 may be configured to implement the HEVC encoding process. During encoding, images 400, 401 may have been partitioned. In some implementations, partitioning may be effectuated using, e.g., the Tiles tool of the HEVC encoder. In some implementations, the tiling operation may be configured to produce one or more centrally located tiles (e.g., 410, 411) and one or more peripherally located tiles (e.g., 402, 404, 406, 408 for image 400; and tiles 403, 405, 407, 409 for image 401) in FIG. 4A. As shown in FIG. 4A, peripheral tiles 402, 404, 406, 408 may contain stitching boundary 256; tiles 403, 405, 407, 409 may contain the stitching boundary 266. In some implementations, partitioning may be effectuated and/or modified for tiling based on a processing order that is suited for maximizing or minimizing processing effort. For example, in some cases the processing effort may be minimized to allow for use on lower performance platforms; in other cases, the platform may support higher performance, and thus support higher processing effort. Such considerations may affect e.g., the tiling configuration and order; for instance, tiling may be based on a raster scan order and/or may be block-based.

Individual tiles in FIG. 4A may be encoded using e.g., motion-constrained tile configurations of HEVC. If motion-constrained tile configurations are unavailable, then the encoder 304 side may be configured to use regular tiles while restricting motion vectors so that they do not cross a tile boundary (e.g., 412 in FIG. 4A). The center tiles 410, 411 may be obtained by encoding the corresponding pixels of images 252, 262 as individual motion-constrained tiles. Tiles 402, 404, 406, 408 for image 400; and tiles 403, 405, 407, 409 for image 401 may be obtained by encoding respective tiles of the images 252, 262 as motion-constrained tiles.

Some of the pixels within the images 400, 401 in FIG. 4A may be disposed outside the area associated with the view field of the respective capture device. Images may be combined (stitched) along a stitching boundary as depicted by broken curve 256, 266 in FIG. 4A. Pixels within images 400, 401 that may lie outside the curves 256, 266 may be excluded from processing operations (e.g., using a mask) in some implementations. In one or more implementations, values of pixels within images 400, 401 that may be outside the curves 256, 266 may be assigned to a given value (e.g., image average value).

Encoded images 400, 401 may be decoded, e.g., using decoder 306. Decoded pairs of images may be stitched together to obtain a panoramic (e.g., 360-degree field of view in some implementations) image. In one or more implementations, image stitching may be effectuated by component 308 of FIG. 3A.

Stitched version of the images 400, 401 may be encoded using component 310 of FIG. 3A to produce a post-stitch encoded image. Encoding operation may include partitioning the stitched image into tiles. In some implementations, the tiling operation may be configured to produce one or more centrally located tiles (e.g., 410, 411) and one or more peripherally located tiles (e.g., 402, 404, 406, 408 for image 400; and tiles 403, 405, 407, 409 for image 401) in FIG. 4A. As shown in FIG. 4A, peripheral tiles 402, 404, 406, 408 may contain stitching boundary 256; tiles 403, 405, 407, 409 may contain the stitching boundary 266.

FIG. 4B illustrates tile configuration of images encoded by the spatially selective encoder. Encoding operation of the component 310 may be configured to effectuate spatially selective encoding. In some implementations, wherein a centrally located region of an image may remain unaffected by the stitching process (e.g., area of tiles 410, 411 in FIG. 4A), values (e.g., bit values) of the center tile(s) of the encoded post stitched image(s) may be assigned to (copied from) values of the center tile of the encoded image prior to stitching.

The encoder process 310 may be configured to duplicate (assign) values of the centrally located tile(s) of the encoded output (e.g., values of the central tile 410 of image 420 in FIG. 4B and values of the central tile 411 of image 421 in FIG. 4B) to values of the tile 410, 411, respectively of images 400, 401 in FIG. 4A. That is, when obtaining encoded images 420, 421, central tiles 410, 411 may be reused (e.g., copied from encoded images 400, 401) in lieu of subsequent encoding. This is illustrated by blank fill of tiles 410, 411 of FIGS. 4A-4B. Reusing previously encoded image portion(s) (e.g., copying previously encoded tile information) may result in lower computational complexity and better image quality, because the tile is not re-encoded.

Memory referencing and/or assignment operations may be characterized by lower computational complexity compared to encoding operations. Information for centrally located tiles may be copied from pre-stitch encoded output (e.g., 328 in FIG. 3A and/or 400, 401 of FIG. 4A) to obtain post-stitch encoded output (e.g., 314 in FIG. 3A and/or images 420, 421 of FIG. 4B). This may be obtained for any applicable rendering projection, including equirectangular and/or cubic projection.

Peripherally located tiles of the images 420, 421 may be obtained by encoding pixels of the corresponding tiles of the stitched images. Although FIGS. 4A-4B illustrate partitioning the image into five tiles, it will be recognized by those skilled in the arts that various other tile configurations may be utilized.

By way of an illustration of processing spherical images, portions 410 and/or 411 correspond to center part of the images 420, 421 respectively. The areas 410 and/or 411 may remain unchanged during the stitching operation on images 420, 421 to obtain a combined image.

Portions 422, 424, 426, 428 may correspond to surrounding (peripheral) areas of the image 420; areas 423, 425, 427, 429 correspond to surrounding (peripheral) areas of the image 421. Image stitching operations on images 420, 421 may cause modification of values of pixels (e.g., during pixel level stitching) disposed proximate periphery of the image 420 and/or 421. Accordingly, peripheral portions of image 420 and/or 421 may be re-encoded subsequent to stitching.

Figure 5:
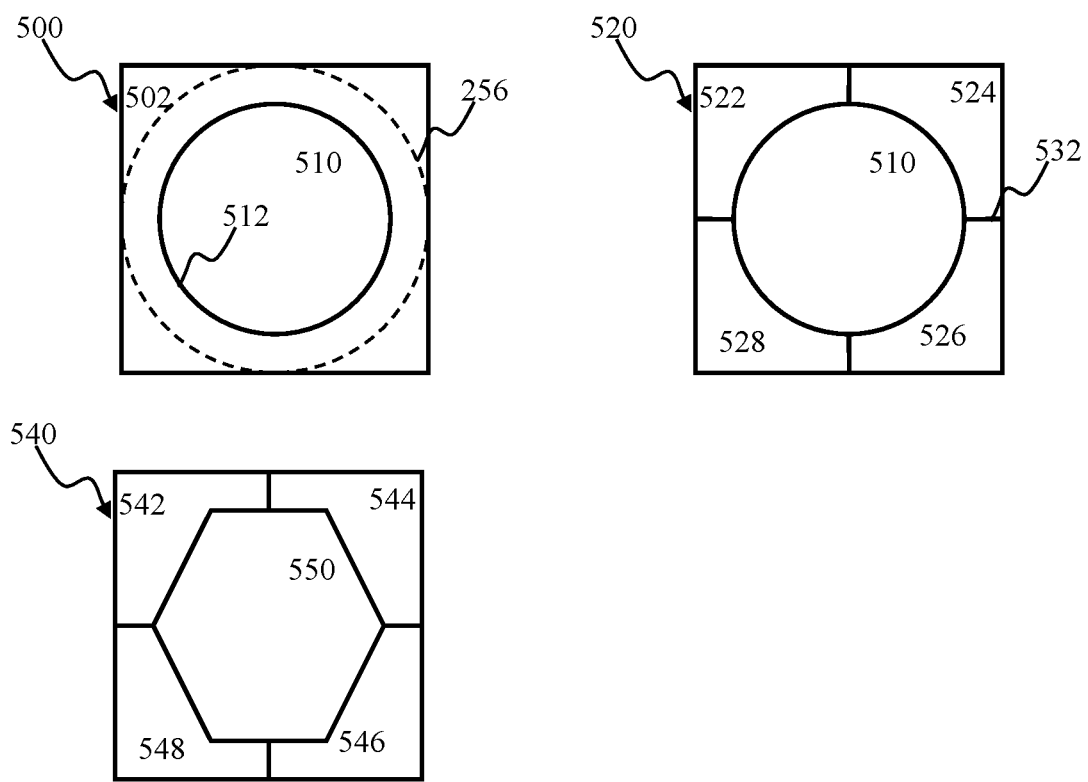
FIG. 5 illustrates exemplary image partitioning configuration for use with the selective encoding methodology of the disclosure.

FIG. 5 illustrates exemplary image partitioning configuration for use with the selective encoding methodology of the disclosure. Images 500, 520, 540 in FIG. 4A may correspond to encoded images 252, 262 shown in FIG. 2B and obtained by a capture device 200 of FIG. 2A. By way of an illustration, images 500, 520, 540 may correspond to output 328 produced by encoder 304.

Partitioning configuration of the image 500 may be obtained by partitioning the image 500 into a circular center portion 510 and a surround portion 502. The surround portion 502 may include locations outside the partition boundary 512. Broken curve 256 in FIG. 5 denotes boundary (e.g., FOV) of a captured image, such as described with respect to FIG. 2A.

Partitioning configuration of the image 520 may be obtained by partitioning the image 500 into a center portion 530 and surrounding portions 522, 524, 526, 528. The surrounding portion 502 may include locations outside the partition boundary, denoted by bald line 532.

Partitioning configuration of the image 540 may be obtained by partitioning the image 540 into a polygonal center portion (e.g., hexagon 550) and surrounding portions 542, 544, 546, 548. It will be realized by those skilled in the arts that various other image partitioning configurations may be utilized. In some implementations, image partitioning configurations (e.g., such as shown and described with respect to FIGS. 4A-4B) may be selected in accordance with functionality provided by a given encoder/decoder (e.g., HEVC) used to encode/decode panoramic content.

Using the selective encoding and/or decoding methodology of the disclosure, pixels of a stitched image corresponding to surrounding image portions, e.g., 502, 522, 524, 526, 528, 542, 544, 546, 548, may be re-encoded subsequent to stitching. In lieu of encoding pixels of a stitched image corresponding to center image portion (e.g., 510, 550), encoded values (e.g., bit values) of encoded image available prior to stitching (e.g., output 328 of encoder 304 and/or 368, 369 of encoders 344, 345 in FIGS. 3A-3B, respectively) may be copied to obtain encoded version of the post-stitched image.

FIG. 6 illustrates a computerized system for encoding content in accordance with one implementation of selective encoding methodology. In some implementations, the system 600 may be configured to encode panoramic and/or VR content as a part of content acquisition and/or content delivery by a capture device (e.g., 110 in FIG. 1A and/or 200 in FIG. 2A). In one or more implementations, the system 600 may be configured to encode content during and/or as a part of content upload and/or playback of previously acquired content.

The system 600 of FIG. 6 may include a processing apparatus 602 (e.g., including capture device 110 of FIG. 1A, 130 of FIG. 1B, a computing device in communications with a capture device and/or content depository, a cloud computing apparatus, and/or other apparatus) configured to obtain audio and/or imaging content, e.g., video and/or photos. Content depository may include a network attached storage (NAS), a portable storage (e.g., flash memory), a cloud storage, a server, a personal computer, a DVR, and/or other storage configuration.

The apparatus 602 may be in operable communication with one or more remote client devices 620 via one or more electronic communications interface 622. The interface 622 may include one or more wired interfaces (e.g., serial, USB, Thunderbolt™, HDMI, Ethernet, and/or other wired interfaces) and/or wireless interfaces (e.g., WiFi, Bluetooth, cellular, and/or other interfaces). For example, such electronic communication links may be established, at least in part, via one or more networks. In some implementations, a network may comprise the Internet and/or may employ other communications technologies and/or protocols. By way of non-limiting example, the interface 622 may employ communication technologies including one or more of Ethernet, 802.11, worldwide interoperability for microwave access (WiMAX), 3G, Lang Term Evolution (LTE), digital subscriber line (DSL), asynchronous transfer mode (ATM), InfiniBand, PCI Express Advanced Switching, and/or other communication technologies. By way of non-limiting example, network 622 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the interface 622 may be represented using formats including one or more of hypertext markup language (HTML), extensible markup language (XML), and/or other formats. One or more exchanges of information between entities of system 100 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 600 may use custom and/or dedicated data communications technologies instead of, or in addition to, the ones described above.

The remote device 620 may include a user interface device, one or more of a portable communications device (e.g., smartphone, a digital camera, a laptop, a tablet computer, a desktop computer, a television set-top box, smart TV, a gaming console, a client computing platform, and/or other platforms), a capture device (e.g., a camera), and/or other device configured to communicate information with the processing apparatus 602. In some implementations, the system 600 may include multiple capture devices, e.g., configured for obtaining panoramic content e.g., such as described in U.S. patent application Ser. No. 14/927,343 entitled "APPARATUS AN D METHODS FOR ROLLING SHUTTER COMPENSATION FOR MULTI-CAMERA SYSTEMS" filed on Oct. 29, 2015, incorporated supra.

The apparatus 602 may include one or more physical processors 604 configured by machine-readable instructions 606 and/or other components. Executing the machine-readable instructions 606 may cause the one or more physical processors 604 to effectuate encoding of content using the methodologies of the disclosure. The machine-readable instructions 606 may include one or more of content access component 607, content decoding component 608, stitching component 610, encoding component 612, content distribution component 614, and/or other components.

One or more features and/or functions of the apparatus 602 may be facilitation of video content acquisition, generation and/or provision of content proxy. It is noted that although the present disclosure is directed to videos and/or video clips, one or more other implementations of system 600 and/or apparatus 602 may be configured for other types of media items. By way of non-limiting example, other types of media items may include one or more of audio files (e.g., music, podcasts, audio books, and/or other audio files), documents, photos, multimedia presentations, digital purchases of goods and services, and/or other media items.

The apparatus 602 may include electronic storage 618. The apparatus 602 may include communication lines or ports to enable the exchange of information with a network and/or other entities. Illustration of apparatus 602 in FIG. 6 is not intended to be limiting. The apparatus 602 may include a plurality of hardware, software, and/or firmware components operating together to provide the functionality attributed herein to apparatus 602. For example, the apparatus 602 may be implemented by a cloud of computing platforms operating together as apparatus 602.

Electronic storage 618 may comprise electronic storage media that electronically stores information. The electronic storage media of electronic storage 618 may include one or both of system storage that is provided integrally (i.e., substantially non-removable) with apparatus 602 and/or removable storage that is removably connectable to apparatus 602 via, for example, a port or a drive. A port may include a USB port, a Firewire port, and/or other port. A drive may include a disk drive and/or other drive. Electronic storage 618 may include one or more of optically readable storage media (e.g., optical disks, etc.), magnetically readable storage media (e.g., magnetic tape, magnetic hard drive, floppy drive, and/or other magnetic storage media), electrical charge-based storage media (e.g., EEPROM, RAM, etc.), solid-state storage media (e.g., flash drive, etc.), and/or other electronically readable storage media. The electronic storage 618 may include one or more virtual storage resources (e.g., cloud storage, a virtual private network, and/or other virtual storage resources). The electronic storage 618 may be configured to store software algorithms, information determined by processor(s) 604, information received from apparatus 602, information received from external resource(s) 624, and/or other information that enables apparatus 602 to function as described herein. In some implementations, the electronic storage 618 may be configured to store encoded image output (e.g., 328, 348, 349 in FIGS. 3A-3B).

The system 600 may include external resource(s) 624 operatively linked via one or more electronic communication links 622. External resource(s) 624 may include sources of information, hosts, and/or other entities outside of system 600, external entities participating with system 600, computing platforms, and/or other resources. In some implementations, some or all of the functionality attributed herein to external resources may be provided by resources included in system 600.

It will be appreciated that this is not intended to be limiting and that the scope of this disclosure includes implementations in which apparatus 602, external resources, and/or other entities may be operatively linked via some other communication media.

Processor(s) 604 may be configured to provide information-processing capabilities in apparatus 602. As such, processor 604 may include one or more of a digital processor, an analog processor, a digital circuit designed to process information, an analog circuit designed to process information, a state machine, and/or other mechanisms for electronically processing information. Although processor 604 is shown in FIG. 6 as a single entity, this is for illustrative purposes only. In some implementations, processor 604 may include one or more processing units. These processing units may be physically located within the same device, or processor 604 may represent processing functionality of a plurality of devices operating in coordination. The processor 604 may be configured to execute components 607, 608, 610, 612, and/or 614. Processor 604 may be configured to execute components 607, 608, 610, 612, and/or 614 by software; hardware; firmware; some combination of software, hardware, and/or firmware; and/or other mechanisms for configuring processing capabilities on processor 604.

It should be appreciated that although components 607, 608, 610, 612, and/or 614 are illustrated in FIG. 6 as being co-located within a single processing unit, in implementations in which processor 604 includes multiple processing units, one or more of components 607, 608, 610, 612, and/or 614 may be located remotely from the other components. The description of the functionality provided by the different 607, 608, 610, 612, and/or 614 described above is for illustrative purposes and is not intended to be limiting, as any of components 607, 608, 610, 612, and/or 614 may provide more or less functionality than is described. For example, one or more of components 607, 608, 610, 612, and/or 614 may be eliminated, and some or all of its functionality may be provided by other ones of components 607, 608, 610, 612, and/or 614 and/or other components. As an example, processor 604 may be configured to execute one or more additional components that may perform some or all of the functionality attributed below to one of components 607, 608, 610, 612, and/or 614.

In FIG. 6, the content component may be configured to access and/or manage image and/or audio content. In some implementations, the component 607 may be configured to effectuate image/audio content acquisition using any applicable methodologies including those described herein. By way of an illustration, the component 607 may be operable to instantiate content acquisition by, e.g., the capture device 200 of FIG. 2A, based on a timer event, user instruction, or a sensor event.

In some implementations, the component 607 may be operable to access previously acquired content from electronic storage 618 and/or external resource(s) 624 (e.g., external storage, and/or remote user device during content upload). The operations performed by the content component 607 may include information timestamping, adjustment of data rate, transcoding, post processing (e.g., adjusting white balance, sharpening, contrast, gamma and/or other parameters), trimming, and/or other operations. In some implementations, the image/audio content and the metadata may be stored in a multimedia storage container (e.g., MP4, MOV) such as described in detail in U.S. patent application Ser. No. 14/622,427, entitled "APPARATUS AND METHODS FOR EMBEDDING METADATA INTO VIDEO STREAM" filed on Oct. 22, 2015, incorporated supra, and/or in a session container (e.g., such as described in detail in U.S. patent application Ser. No. 15/001,038, entitled "METADATA CAPTURE APPARATUS AND METHODS" filed on Jan. 19, 2016, the foregoing being incorporated herein by reference in its entirety).

In FIG. 6 the decoding component 608 may be configured to decode content accessed by the component 607. In some implementations, the content decoding may be effectuated using operations described with respect to decoding components 306, 346, 347 of FIGS. 3A-3B. In one or more implementations, the decoding component 608 may be configured to effectuate partial decoding. By way of an illustration of decoding an encoded image (e.g., 420 of FIG. 4B), the decoding component 608 may be configured to decode peripheral portions of the image (e.g., 422, 424, 426, 428 in FIG. 4B) while bypassing/skipping decoding of the centrally located portion (e.g., 410) of encoded image. Output of the decoding process may include one or more images (e.g., left/right images 252, 262 of FIG. 2A).

In FIG. 6 the stitching component 610 may be configured to effectuate stitching of decoded content. In some implementations, stitching operations may include pixel level stitching of two hemispherical images including, e.g., determination of an overlap area between the images, determination of pixel locations at and/or proximate boundary area (e.g. denoted by line 256, 266 in FIG. 2A), image warp, pixel blend, and/or other operations.

In FIG. 6, content encoding component 612, may be configured to effectuate obtaining of an encoded bitstream of stitched content obtained by component 610. Content encoding may be configured in accordance with selective encoding methodology of the disclosure. In some implementations, the encoding component 612 may be configured to encode peripheral portions of the stitched images (e.g., 422, 424, 426, 428, 423, 425, 427, 429, of FIG. 4B, 502, 522, 524, 526, 528, 542, 544, 546, 548 of FIG. 5). The encoder 612 may be configured to utilize encoded information of the encoded content when obtaining encoded output for centrally located image portions (e.g. 410, 411, 510, 550 in FIGS. 4B, 5, respectively). By way of an illustration, when encoding stitched image 420, values (e.g. bit values) corresponding to image portion 410 may be copied from the respective image portion of the encoded pre-stitch content (e.g., such as accessed by the component 607).

In FIG. 6, content distribution component 614, may be configured to provide the encoded content. The content provision may include storing the content on the storage component 618 for viewing; broadcasting content, and/or otherwise delivering content to one or more client devices (e.g., the remote device 620 (e.g., smartphone), screen of a user interface device, and/or external resource (e.g., cloud storage)), and/or other operations.

Methods

Figure 7A:
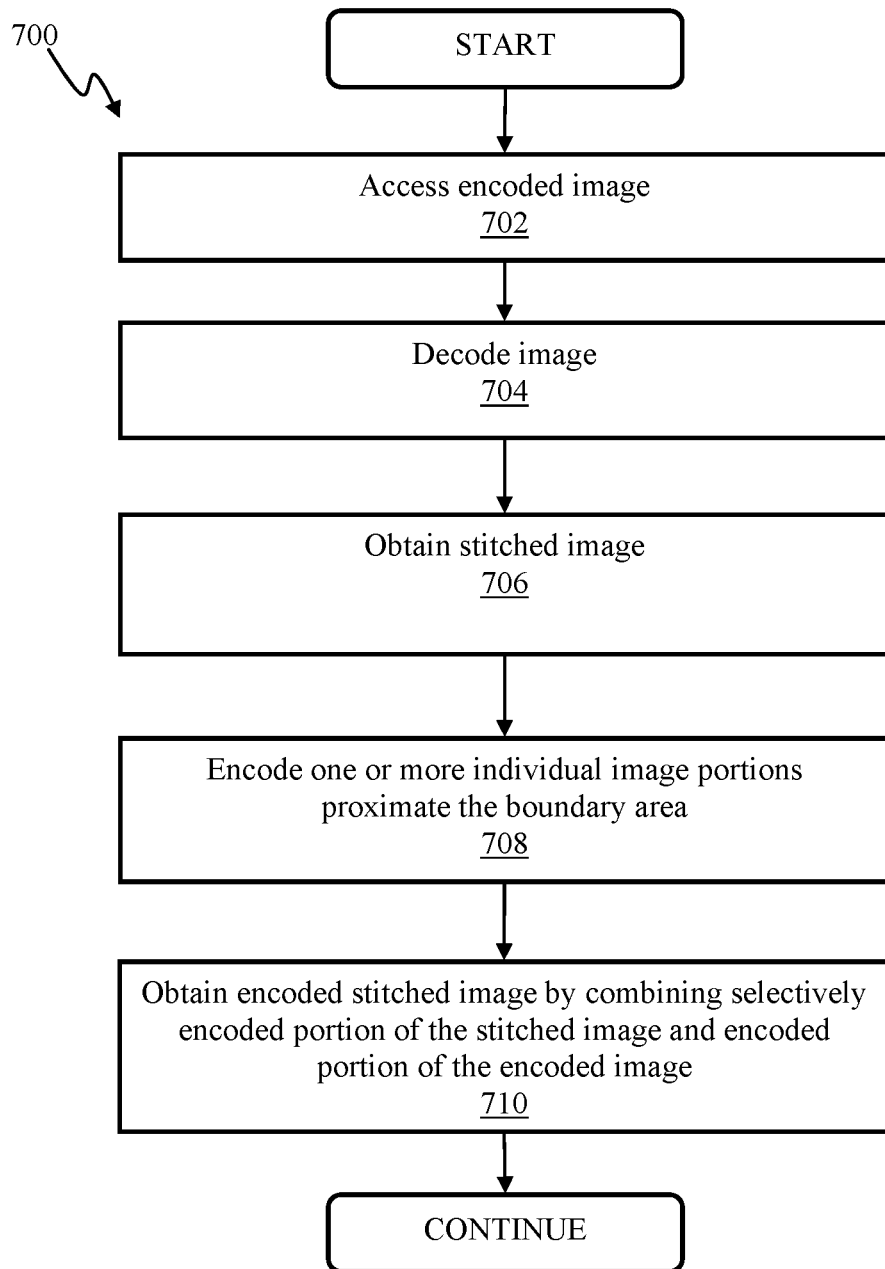
FIGS. 7A-7B are logical flow diagrams illustrating methodologies for selectively encoding panoramic imaging content.
Figure 7B:
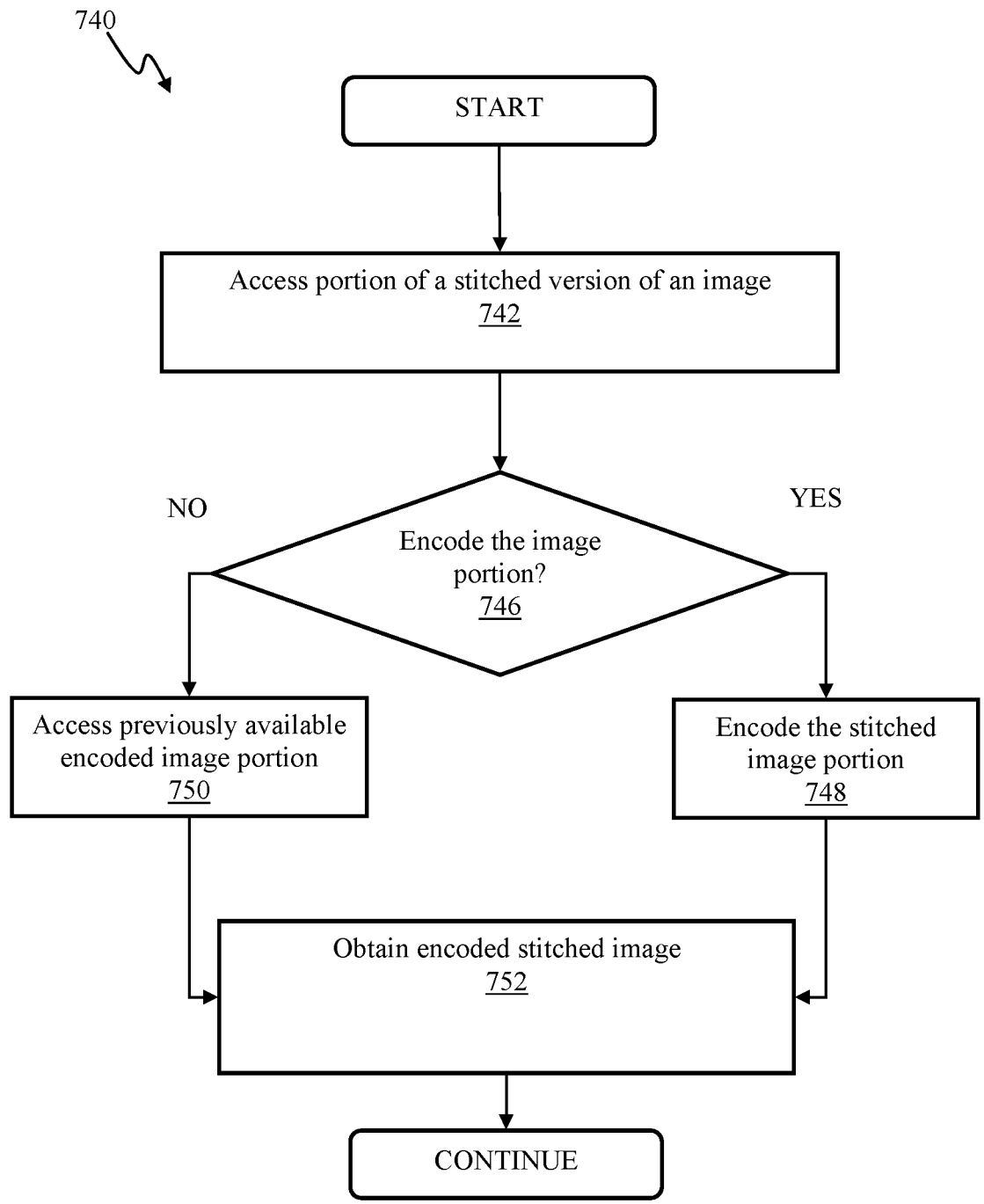

FIGS. 7A-7B illustrate methods 700, 720, for providing panoramic content in accordance with some implementations of the present disclosure. The operations of methods 700, 740 presented below are intended to be illustrative. In some implementations, methods 700, 740 may be accomplished with one or more additional operations not described, and/or without one or more of the operations discussed. Additionally, the order in which the operations of methods 700, 740 are illustrated in FIGS. 7A-7B and described below is not intended to be limiting.

In some implementations, methods 700, 740 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 700, 740 in response to instructions stored electronically on an electronic storage medium. The one or more processing devices may include one or more devices configured through hardware, firmware, and/or software to be specifically designed for execution of one or more of the operations of methods 700, 740. Operations of methods 700, 740 may be effectuated by one or more devices and/or computerized systems including these described with respect to FIGS. 1A-1B and/or FIG. 6.

FIG. 7A is logical flow diagram illustrating a method of obtaining encoded panoramic content in accordance with one implementation of the present disclosure. Method 700 of FIG. 7A may be implemented by, e.g., system 600 of FIG. 6. In some implementations, operations of method 700 may be effectuated by a capture device (e.g., 200 of FIG. 2A) during and/or as a part of imaging content acquisition.

At operation 702 of method 700 encoded image content may be accessed. In some implementations, the content may include a sequence of high resolution images (e.g., 4K, 8K, and/or other resolution) captured and encoded by a capture device (e.g., 200 of FIG. 2A) and/or obtained from a content storage entity. In or more implementations, the accessed content may correspond to spherical content (e.g., pairs of hemispherical images 252, 262).

At operation 704 one or more encoded images of the content may be decoded. By way of a non-limiting illustration, images of input 342, 343 may be encoded by encoder components 344, 343 operable in accordance with HEVC codec.

At operation 706, a stitched image may be obtained. In some implementations, the image stitching operation may include modification of pixels of one or more images in an area proximate a boundary between field of views associated with individual images. Image stitching operation may include pixel level stitching configured to reduce a difference measure between values of pixels of one image and pixels another image corresponding to a given location in field of view. In one implementation, the difference measure may include a contrast measure.

At operation 708, one or more portions of the stitched image may be encoded using selective encoding methodology. By way of an illustration, portions 422, 424, 426, 428 may correspond to surrounding (peripheral) areas of the image 420 of FIG. 4B; as such values of pixels within one or more portions 422, 424, 426, 428 may be modified by the stitching process; image portion 422, 424, 426, 428 may be encoded during operation 708. Using selective encoding and/or decoding methodology of the disclosure, pixels of a stitched image corresponding to surrounding image portions, e.g., 502, 522, 524, 526, 528, 542, 544, 546, 548 of FIG. 5 may be encoded during operation 708 subsequent to stitching operation 706.

At operation 710, an encoded version of the stitched image may be obtained. In some implementations, the encoded stitched image may be obtained by combining selectively encoded portion(s) of the stitched image and previously encoded portion(s) of the encoded image accessed at operation 702. By way of an illustration, when encoding stitched image 420 of FIG. 4B, values of the previously encoded center portion 410 of the encoded image 400 (e.g., and accessed at operation 702) may be utilized in lieu of encoding pixels of a stitched image corresponding to center image portion.

FIG. 7B is logical flow diagram illustrating a method of selectively encoding an image in accordance with one implementation of the present disclosure. In some implementations, operations of method 740 may be effectuated during acquisition and/or playback of content that has been previously acquired and/or encoded.

At operation 742 of method 720, a portion of a stitched version of an image is accessed.

At operation 746, an evaluation may be made as to whether image portion(s) are to be encoded.

Responsive to a determination at operation 746 that a portion of the stitched image is to be encoded the method may proceed to operation 748 wherein the stitched image portion(s) may be encoded. In some implementations, encoding operation 748 may include encoding the image portion as a motion-constrained tile of HEVC encoder.

Method 740 may be configured to implement selective encoding wherein: (i) centrally located image portions (tiles) may be not encoded but information for these tiles may be copied from a respective portion of previously encoded image; (ii) peripherally located image portions (tiles) may be encoded. By way of an illustration, operation 746 may be configured to determine as to whether a give image portion (tile) may correspond to a centrally located or peripherally located portion. In some implementations, the determination of operation 746 may be configured based on an image map, look up table, a rulebook, and/or other process.

Responsive to a determination at operation 746 that the portion of the stitched image is not to be encoded the method may proceed to operation 750 wherein the contents of the respective portion of the previously encoded image may be copied.

By way of an illustration, it may be determined at operation 746 that a given portion of the stitched image represents a peripherally located portion (e.g., 422 of image 420). Contents of the portion 422 may be encoded as a motion-constrained tile of HEVC encoder.

At operation 752 encoded stitched image may be obtained. In some implementations, the encoded version of the stitched image may be obtained by combining the previously available portion (e.g., such as obtained at operation 750) and one or more of the encoded stitched image portions (e.g., such as obtained at operation 748). By way of an illustration, the encoded version 420 of the stitched image may be obtained by combining a previously encoded central portion 410 of image 400 and portion 422, 424, 426, 428 re-encoded using motion constrained tiles.

Encoding methodology described herein may be utilized for encoding stitched spherical (360-degree) images and/or VR video. In some implementations, selective encoding functionality may be embodied in a spherical image capture device that may include two lenses configured to capture pairs of hemispherical images. Individual images may be characterized by 180-degree (or greater) field of view. The capture device may store a pair of images representing left and right hemispheres encoded (in camera) using any applicable codec, e.g., H.264 or HEVC). In some implementations, methodology of the disclosure may be utilized with capture devices that may include four, six, eight, twelve, sixteen, and/or other number of lenses and/or image sensors.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C #, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "connection", "link", "wireless link" means a causal link between any two or more entities (whether physical or logical/virtual), which enables information exchange between the entities.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed is:
1. A system, comprising:
   a processing apparatus that includes a first processor configured to execute instructions to:
      access encoded content, wherein the encoded content includes:
         an encoded first centrally located tile corresponding to a first centrally located tile of a first image,
         an encoded first peripherally located tile of the first image, and
         an encoded second peripherally located tile of a second image;
      decode the encoded first peripherally located tile to obtain a decoded first peripherally located tile;
      decode the encoded second peripherally located tile to obtain a decoded second peripherally located tile;
      stitch the decoded first peripherally located tile and the decoded second peripherally located tile to obtain a stitched image portion;
      encode the stitched image portion to obtain an encoded stitched image portion; and
      obtain an encoded stitched image of the first image and the second image by combining the encoded first centrally located tile, and the encoded stitched image portion.

2. The system of claim 1, wherein the encoded content is obtained from an imaging device comprising a second processor configured to execute instructions to:
   partition the first image into the first centrally located tile and first peripherally located tiles, wherein the first peripherally located tiles include the first peripherally located tile;

partition the second image into a second centrally located tile and second peripherally located tiles, wherein the second peripherally located tiles include the second peripherally located tile, and wherein the first peripherally located tile and the second peripherally located tile include a stitching boundary;

encode the first centrally located tile, to obtain the encoded first centrally located tile, without reference to any of the first peripherally located tiles; and encode the second centrally located tile, to obtain an encoded second centrally located tile, without reference to any of the second peripherally located tiles.

3. The system of claim 2, wherein the first centrally located tile and the second centrally located tile are encoded without reference to peripherally located tiles using motion-constrained tile configurations of a High Efficiency Video Coding (HEVC) codec.

4. The system of claim 2, wherein the first centrally located tile is encoded without reference to the first peripherally located tiles by restricting motion vectors so that they do not cross a tile boundary.

5. The system of claim 1, wherein the first processor is further configured to execute instructions to:

omit decoding the encoded first centrally located tile responsive to a determination not to decode the encoded first centrally located tile.

6. The system of claim 5, wherein the determination not to decode the encoded first centrally located tile is made based one of an image map, a look up table, or a rulebook.

7. The system of claim 1, wherein the instructions to combine the encoded first centrally located tile and the encoded stitched image portion comprise to:

copy pixel values of the encoded first centrally located tile into the encoded stitched image.

8. The system of claim 1, the first processor is further configured to execute instructions to:

decode the encoded stitched image for display in a panoramic image.

9. A method, comprising:

partitioning images into one or more centrally located tiles and one or more peripherally located tiles, wherein the images are partitioned such that the peripherally located tiles contain a stitching boundary and the centrally located tiles do not contain any stitching boundaries; and encoding the images to obtain encoded images, wherein the centrally located tiles are encoded without reference to the peripherally located tiles, and wherein the encoded images include respective encoded centrally located tiles and respective encoded peripherally located tiles.

10. The method of claim 9, further comprising:

modifying a tiling operation that partitions the images based on a processing order that maximizes or minimizes processing effort.

11. The method of claim 9, wherein the centrally located tiles are obtained by encoding corresponding pixels of the images as individual motion-constrained tiles.

12. The method of claim 9, wherein the centrally located tiles are encoded without reference to the peripherally located tiles using a motion-constrained tile configurations of a High Efficiency Video Coding (HEVC) codec.

13. The method of claim 9, wherein the centrally located tiles are encoded without reference to the peripherally located tiles by restricting motion vectors so that the motion vectors do not cross a tile boundary.

14. The method of claim 9, further comprising:

stitching the images, to obtain a stitched image, by decoding the respective encoded peripherally located tiles and omitting decoding the respective encoded centrally located tiles based on one of an image map, a look up table, or a rulebook.

15. The method of claim 14, wherein stitching the images, to obtain the stitched image, comprises:

decoding the respective encoded peripherally located tiles; and stitching the decoded respective encoded peripherally located tiles.

16. The method of claim 14, further comprising:

encoding the stitched image to obtain an encoded stitch image, wherein encoding the stitched image comprises:

copying pixel values of the respective encoded centrally located tiles into the encoded stitched image.

17. A non-transitory computer-readable storage medium, comprising executable instructions that, when executed by a processor, facilitate performance of operations comprising to:

receive encoded content, wherein the encoded content includes:

an encoded centrally located tile corresponding to a centrally located tile of a first image, encoded first peripherally located tiles of the first image, and encoded second peripherally located tiles of a second image;

decode the encoded first peripherally located tiles and the encoded second peripherally located tiles, and omit decoding the encoded centrally located tile;

stitch at least one of the decoded first peripherally located tile and at least one of the decoded second peripherally located tile to obtain a stitched image portion;

encode the stitched image portion to obtain an encoded stitched image portion; and obtain an encoded stitched image of the first image and the second image by combining the encoded centrally located tile and the encoded stitched image portion.

18. The non-transitory computer-readable storage medium of claim 17, wherein the centrally located tile is encoded without reference to peripherally located tiles using a motion-constrained tile configurations of a High Efficiency Video Coding (HEVC) codec.

19. The non-transitory computer-readable storage medium of claim 17, wherein the centrally located tile is encoded by restricting motion vectors so that the motion vectors do not cross a tile boundary.

20. The non-transitory computer-readable storage medium of claim 17, wherein the encoded centrally located tile does not contain stitching boundaries.

* * * * *